(12) United States Patent
Lam et al.

(10) Patent No.: US 7,562,859 B2
(45) Date of Patent: *Jul. 21, 2009

(54) GATE VALVE WITH TONGUE AND GROOVE OR BRIDGING SEAL TO ANNULAR SEAT ELEMENTS

(75) Inventors: Tony M. Lam, Edmonton (CA);
Andrew F. Masson, Edmonton (CA);
Tianle Guo, Edmonton (CA); Glen M. Eleniak, Ardrossan (CA)

(73) Assignee: Stream-Flo Industries Ltd., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/953,779

(22) Filed: Dec. 10, 2007

(65) Prior Publication Data

US 2008/0164437 A1    Jul. 10, 2008

Related U.S. Application Data

(63) Continuation-in-part of application No. 11/205,751, filed on Aug. 17, 2005, now Pat. No. 7,306,201.

(60) Provisional application No. 60/603,389, filed on Aug. 20, 2004, provisional application No. 60/619,765, filed on Oct. 18, 2004.

(51) Int. Cl.
*F16K 25/00* (2006.01)
(52) U.S. Cl. .................. 251/195; 251/190; 251/327
(58) Field of Classification Search ............... 251/170, 251/190, 195, 326, 327, 328, 359
See application file for complete search history.

(56) References Cited

U.S. PATENT DOCUMENTS 3,993,285 A    11/1976   Conley (Continued)

FOREIGN PATENT DOCUMENTS

GB             6539      9/1914
GB           722922      2/1955

OTHER PUBLICATIONS

Undated trade sales and information brochure for Cameron FL, FLS, and FLS-R Gate Valves.

(Continued)

*Primary Examiner*—John K Fristoe, Jr.
(74) *Attorney, Agent, or Firm*—Greenlee Winner and Sullivan PC

(57) ABSTRACT

A gate valve for controlling fluid flow, with a valve body forming a cylindrical flowbore and a gate cavity intersecting the flowbore to provide opposed openings. Seat pockets formed in the opposed openings may optionally include a metal carrier ring. A non-metallic bridging seal formed as a face seal is provided between the first seal surface of the annular seat element and the seat pocket. The bridging seal bridges any gap formed at the first seal surface such that sealing engagement is maintained across the gap at all times as the gate moves between open and closed positions, while still permitting limited axial movement of the annular seat element. Preferred embodiments of the bridging seal include tongue and groove seals and bridge ring inserts. A secondary seal to the seat pocket may be included as a corner, periphery or face seal, for example as an O-ring, U-ring or wiper seal.

52 Claims, 27 Drawing Sheets

U.S. PATENT DOCUMENTS

| | | |
|---|---|---|
| 4,055,325 A | 10/1977 | Vyvial |
| 4,113,233 A | 9/1978 | Bond |
| 4,136,710 A | 1/1979 | Bond |
| 4,155,536 A | 5/1979 | Saiki |
| 4,208,035 A | 6/1980 | Alvarev et al. |
| 4,258,743 A | 3/1981 | Dare et al. |
| 4,364,544 A | 12/1982 | Kim |
| 4,629,161 A | 12/1986 | Jones et al. |
| 4,643,395 A | 2/1987 | Williams, Jr. |
| 4,645,179 A | 2/1987 | Ali |
| 4,741,509 A | 5/1988 | Bunch et al. |
| 4,824,074 A | 4/1989 | Baugh |
| 4,878,651 A | 11/1989 | Meyer |
| 5,029,812 A | 7/1991 | Haynes |
| 5,083,582 A | 1/1992 | Lawson |
| 5,192,051 A | 3/1993 | Roberson |
| 5,346,179 A | 9/1994 | Lochmann |
| 5,727,775 A | 3/1998 | Rodger et al. |
| 5,730,419 A | 3/1998 | Williams et al. |
| 5,762,320 A | 6/1998 | Williams et al. |
| 6,260,822 B1 | 7/2001 | Puranik |
| 6,279,875 B1 | 8/2001 | Chatufale |
| 6,401,747 B1 | 6/2002 | Cain et al. |
| 6,664,572 B2 | 12/2003 | Chatufale |
| 7,004,452 B2 | 2/2006 | Chatufale |
| 7,306,201 B2 | 12/2007 | Lam |

OTHER PUBLICATIONS

Undated trade sales and information datasheet for Bel Valves Thro Conduit Gate Valves.

Undated trade sales and information brochure for FMC Surface Wellheads 100 Series Gate Valves (models 110, 120, 130, 140).

FMC Surface Wellheads (visited Jan. 10, 2002). "Model 130 Gate Valve" [www document] URL http://fmcwellhead.com/FMC/surface_surface_product_display_detail_action/1,6562.

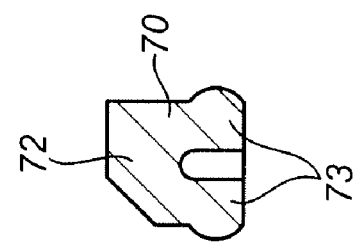
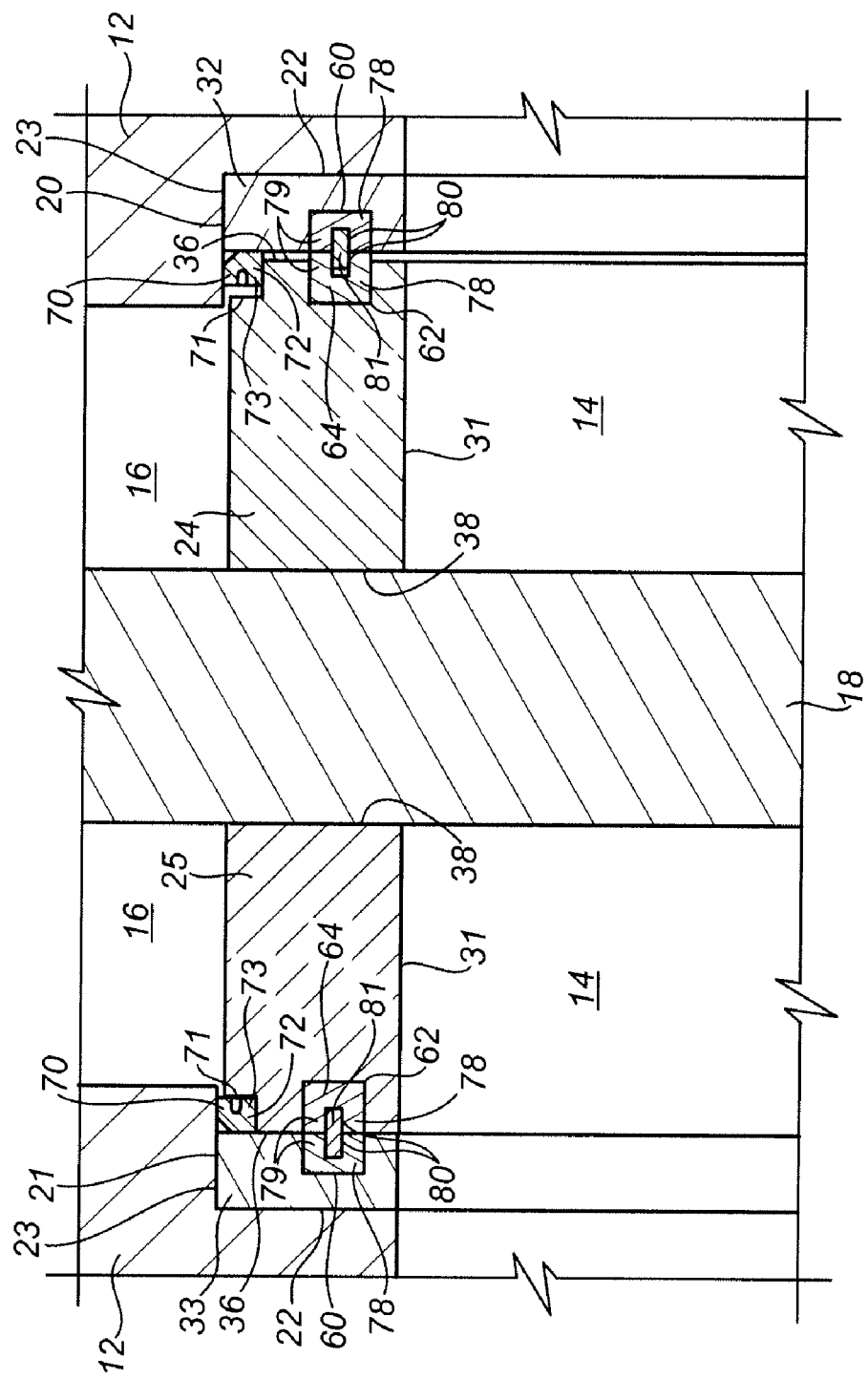

GATE VALVE WITH TONGUE AND GROOVE OR BRIDGING SEAL TO ANNULAR SEAT ELEMENTS

CROSS REFERENCE TO RELATED APPLICATIONS

This application is a Continuation-In-Part of pending U.S. application Ser. No. 11/205,751, filed Aug. 17, 2005, which in turn claims the benefit under 35 U.S.C. 119(e) of U.S. Provisional Application No. 60/603,389 filed Aug. 20, 2004, and of U.S. Provisional Patent Application No. 60/619,765 filed Oct. 18, 2004, all of which are incorporated in their entirety herein to the extent that there is no inconsistency with the present disclosure.

BACKGROUND OF THE INVENTION

This invention relates to a gate valve with improved seals to the annular seat elements.

Gate valves of slab gate valve type typically include floating annular seat elements sealed in counterbores or seat pockets in the flowbore of the valve body on either side of the slab gate. The annular seat elements are mounted for "floating" or limited axial movement toward and away from the slab gate. Gate valves of this nature, the problems inherent with fines entering the sealing areas, and the prior art efforts to solve these problems are well reviewed in prior art patents, see for example U.S. Pat. Nos. 4,645,179; 5,029,812; 5,727,775; 6,279,875; 6,664,572; and 7,004,452. Gate valves of the expanding gate valve type are distinctly different from slab gate valves in that they typically include an expanding or split gate and fixed valve seats which have an interference fit relative with the seat pockets. The expanding gate is typically formed from wedge shaped gate members which slide against each other to "expand" the width of the gate as the gate is opened and closed. Alternatively, the gate might be split to accommodate springs. This expanding action seals the gate against the fixed seats. Fixed seats of this type suffer problems in that, despite the interference fit with their seat pocket, they are not positively held in place and can work their way out of the seat pockets, especially after the valve has been cycled repeatedly. Many locking and sealing mechanisms have been proposed to solve the problems of fixed seats of expanding gate valves. However, these problems are generally not faced by gate valves with floating seats, where the annular seat elements are designed to move (float) upstream and/or downstream with the opening and closing of the slab gate member, such that the opposing seal surfaces (or faces) of the annular seat elements seal to the gate on one seal surface and to the seat pocket on the opposing seal surface. In the slab gate valve designs, carrier rings having an interference fit to the seat pockets might be used, in which case the annular seat elements seal against the gate on one side, and the carrier ring on the other side. Gate valves are also known which have expanding or split gate, but which also use floating annular seat elements, although these are less common.

In the slab gate valve design with floating seat elements, tight clearances and metal-to-metal sealing surfaces are maintained between the valve body (i.e., seat pockets with optional metal carrier rings), the annular seat element and the gate. Despite the tight clearances, gaps exist between all surfaces. The upstream annular seat element (generally at the inlet) and the gate float downstream (generally toward the outlet) with the pressure to seal against the downstream annular seat element. Particles smaller than the gap between the sealing surfaces may enter the gap. Flow through a gate valve is usually in one direction, with the gate valve holding pressure in the opposite direction. With a slab gate valve type having floating annular seat elements, the flow and sealing can occur from either direction, to be a bidirectional valve. Over time, fine particles can get in between all surfaces, preventing the metal-to-metal seal from forming, and eventually produce leakage.

SUMMARY OF THE INVENTION

The seat seal arrangement of the gate valve of the present invention is designed to provide a non-metallic bridging seal which is formed as a face seal which bridges any gap between the annular seat elements and either the radial base of the seat pocket, or an optional metal carrier ring which might be sealed in the seat pocket. The bridging seal is adapted such that sealing engagement is maintained across this gap at all times, including as the gate is moved between the open and closed positions, while still permitting the limited axial movement (i.e. floating) of the annular seat element.

In some embodiments, this bridging seal takes the form of a tongue and groove seal. The tongue may be formed by machining the face of the seat pocket or an optional metal carrier ring seated in the seat pocket, to provide an annular lip. Alternatively, the tongue may be formed as an annular lip on the seal surface of the annular seat elements facing the seat pocket. Still alternatively, the tongue may be provided as an annular lip on a tongue-forming ring insert installed in the radial base of the seat pocket, the carrier ring if present, or by the annular seat elements. A generally U-shaped non-metallic ring seal is tightly engaged with the tongue, the U-shaped ring seal being installed in an annular groove in the member opposite the tongue. This tongue and groove sealing engagement is maintained even as the annular seat element and the gate move from side to side (i.e., along the linear axis of the annular seat elements) under pressure as the gate is opened or closed. In preferred embodiments, each tongue of the one or more tongue and groove seals extends into the annular groove with a depth that is greater than the limited axial movement permitted by the sum of all the gaps along the flowbore axis of the annular seat elements between the gate, the annular seat elements, the seat pockets and the carrier metal rings, if present.

In other embodiments, the non-metallic bridging seal is provided as a non-metallic bridge ring insert held in grooves between the first seal surface of each annular seat element and, either the radial base of the seat pocket, or the carrier ring if present. More particularly, this type of bridging seal includes a) a first annular groove formed either on the first seal surface of the annular seat member or, on the radial base or carrier ring if present, b) a second annular groove formed in the member opposite the first annular groove, the second annular groove being aligned with the first annular groove, and c) a non-metallic bridge ring insert held in each of the first and second annular grooves so as to bridge a gap at the first seal surface such that sealing engagement is maintained across said gap at all times as the gate is moved between the open and closed positions. In a preferred embodiment, the bridge ring insert is formed from a pair of opposing, aligned, non-metallic, U-shaped ring inserts held between and in the first and second annular grooves, the U-shaped ring inserts having leg portions which face each other in abutting relationship to form a rectangular space therebetween; and a rectangular ring insert held in tight fitting relationship enclosed in the rectangular space.

Preferably, a secondary non-metallic ring seal to the annular seat elements is provided. This secondary seal is located in an annular groove formed in the annular seat element, or in the seat pocket or the carrier ring if present. This secondary seal is advantageous in preventing fines from entering and building up in the sealing surfaces in the seat pocket, particularly on either side of the bridging seal. This secondary seal thus assists in preserving an area adjacent the bridging seal (between the bridging seal and the secondary seal) for formation of the needed metal-to-metal seal during opening and closing of the gate. Thus, the secondary seal may be located at one or more of the following positions:

i) along the first seal surface of the annular seat element on either or both sides of the bridging seal to seal against the radial base of the seat pocket or against the carrier ring if present (i.e., as a face seal):

ii) at or adjacent the periphery edge of the annular seat element located within the seat pocket (i.e., as a corner seal), or iii) at the outside diameter of the annular seat element (i.e., as an outside diameter seal).

Particularly preferred embodiments of the secondary seal include a U-ring, a wiper seal or an O-ring. This secondary seal may be weakened, for example by forming cut-away portions or scoring of the secondary seal, or by shaping the ring seal for venting so as to allow pressure build up between the bridging seal and the secondary seal to dissipate more quickly.

When the secondary seal is the U-ring seal, it may be formed with a generally rectangular base portion and leg portions opening in a generally U-shaped manner from the base portion. This U-ring seal is preferably oriented within its annular groove such that the leg portions face away from the bridging seal, and with one or both of the leg portions forming the seal. In this manner, the U-ring seal has been found to best withstand extrusion during repeated use, particularly in high pressure environments. This has also been found to avoid the need for spring biasing the U-ring, as shown in U.S. Pat. No. 6,279,875.

It has also been found that locating the secondary seal as a face seal on the flowbore side of the bridging seal is advantageous in preventing fines from entering the gap between the annular seat elements and the radial base of the seat pocket or the carrier ring if present. This assists in preserving the face seal area between the bridging seal and the secondary seal without fines buildup, thus allowing this area to form the metal-to-metal seal required during the opening and closing of the gate valve. The secondary seal formed on the flowbore side of the bridging seal may take a wide number of forms, including preferred embodiments of a U-ring seal, an O-ring seal or a wiper seal.

BRIEF DESCRIPTION OF THE DRAWINGS

FIG. 27 is a side sectional view of the same area as FIG. 2, showing features similar to FIG. 15, but showing a non-metallic bridging seal as shown in FIG. 26.

FIG. 28 is a sectional view showing a preferred shape of the secondary U-ring seals for venting purposes.

DETAILED DESCRIPTION

Figure 1:
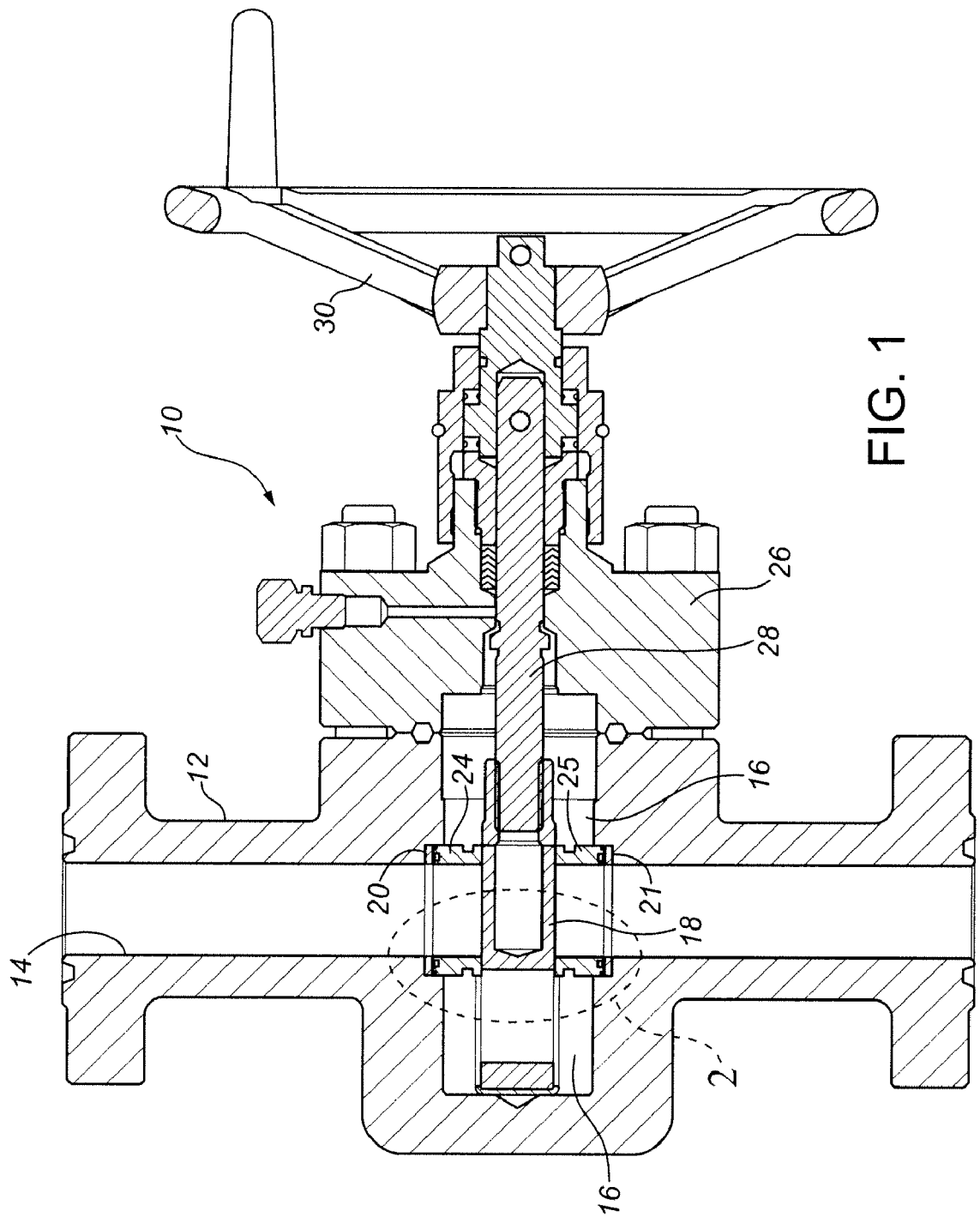
FIG. 1 is a side sectional view of the gate valve of the present invention, showing the annular seat elements sealed in seat pockets of the valve body.

As used herein and in the claims, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements. Thus, for example, the terms "a tongue" and "a groove" are intended to include embodiments with multiple tongue and grooves.

As used herein and in the claims, the terms "side to side"; "side"; "upstream"; and "downstream" and other like terms indicating relative positions above/or below or to the side of a given point or element are used in this description or figures to more clearly describe some embodiments of the invention. However, when applied to apparatus and methods for use in wellheads, such terms may refer to a left to right, right to left, up or down or other relationship as appropriate.

As used herein and in the claims, the terms "generally U-shaped ring seal" or "U-ring" are meant to include ring seals which are generally U-shaped in cross section, with generally U-shaped including not only the strict U-shaped ring seals shown in the Figures, wherein both the outer and inner surfaces of the ring seal have general right angled U-shaped profile, but also ring seals having more generally rounded or tapered outer and/or inner surfaces. In general the outer surface of the ring seal is shaped to form a close fit with the particular geometry of the annular groove formed to retain it. For the tongue and groove seal, the inner surface of the U-shaped ring seal is shaped to form a close fit with the particular geometry of the tongue member so as to create a tongue and groove sealing relationship between the U-shaped ring seal and the tongue member. With respect to the tongue and groove U-shaped ring seal, the term "U-shaped ring seal" also extends to ring seals which provide multiple generally U-shaped grooves, such as a double U-shaped ring seal, adapted to receive multiple tongue members.

"Limited axial movement" when used herein and in the claims refers to the amount of movement that is permitted along the linear axis (flowbore axis) of the annular seat elements as the upstream annular seat element and the gate float downstream to seal the downstream annular seat element in its seat pocket. This limited amount of movement is the sum of all the "gap" or "clearance" along this axis between the valve body seat pocket (or carrier metal rings if present), the annular seat elements and the gate.

"Face seal" when used herein and in the claims refers to a seal formed only between two parallel planar facing surfaces, for instance between the first seal surface of the annular seat elements and the radial base of the seat pockets. A "face seal" when used herein and in the claims is not meant to include an edge or corner sealing function to another non-parallel surface, rather a "face seal" is formed only to a facing and parallel surface.

"Corner seal" when used herein and in the claims refers to a seal to the perpendicular surfaces forming the corner being sealed.

"Outside diameter seal" when used herein and in the claims refers to a seal formed between the outside diameter of the annular seat element either against the side wall of the seat pocket or against the side wall of the carrier ring. An outside diameter seal is sometimes also referred to as a "radial seal".

Having reference to FIG. 1, the gate valve of this invention is shown generally at 10 to include a pressure-containing valve body 12, which is flanged for connection with pressure tight seals to other wellhead components (not shown). Alternate connections apart from flange connections may be used as is known in the art. The valve body 12 forms a central, generally cylindrical flowbore 14 which extends there through. A gate cavity 16 which intersects the flowbore 14, is also formed in the valve body 12. One end of the gate cavity 16 is closed by the wall of the valve body 12, while the other end is open to the exterior. A slab gate 18 is mounted for sliding movement across the flowbore 14 between an open and closed position. At each of the opposing openings into the flowbore 14, the valve body 12 forms a preferably right cylindrical counterbore, (termed seat pocket) 20, 21. The seat pockets 20, 21 each have a radial base 22 and a side wall 23 (see FIG. 2). A pair of annular seat elements 24, 25 are mounted within the seat pockets 20, 21 for limited axial movement therein, such that each of the annular seat element 24 or 25 maintains sealing engagement between the gate 18 and the seat pocket 20 or 21 as the gate 18 is moved between its open and closed positions. Optional carrier rings 32, 33 (see FIG. 2) may be used, each having an interference fit with the seat pockets 20, 21. In FIGS. 2-27, seat pockets 20, 21, annular seat elements 24, 25 and carrier rings 32, 33 are symmetrical, so are shown interchangeable side for side.

While the gate 18 is shown as a slab gate in the Figures, the invention may extend to expanding gates or split gates, as known in the art, as may be used with floating annular seat elements.

Attached in sealing relationship to the valve body 12 at the open end of the gate cavity 16 is a bonnet 26. A gate stem 28 is fastened at one end to the gate 18 and at its other end to a valve operator, such as a manual crank 30 for moving the gate 18 between its open and closed positions. Alternatively stem attachments may be used, for example the gate 18 could be fastened to the stem through a gate nut (not shown). The gate stem 28 is sealed within the bonnet 26, in a manner as is well known in the art.

The non-metallic bridging seals of the present invention are shown in multiple embodiments in FIGS. 2-27, with FIGS. 2-8 and 11-25 showing the bridging seal formed with rings and grooves to form a tongue and groove seal (tongue on one side sealing in groove formed opposite), and FIGS. 9, 10, 26, and 27 showing the bridging seal formed as a bridge ring insert held within grooves formed on both sides. The bridging seals are preferably symmetric on both sides of the gate 18. In all cases, the bridging seals of the present invention are formed as face seals such that there are bridge elements (ex. tongue or bridge ring insert) which extend across (i.e., bridge) and seal any gap between the sealing faces of the annular seat elements 24, 25 and the seat pockets 20, 21 (or the carrier rings 32, 33 if present). This bridging of this gap allows the annular seat elements 24, 25 to maintain sealing engagement between the gate 18 and the seat pockets 20, 21 (or carrier rings 32, 33 if present) at all times as the gate 18 and the annular seat elements 24, 25 move side-to-side (i.e., float upstream or downstream) as the gate 18 is moved between its open and closed positions. In this manner, the bridging seals of this invention accommodate the limited axial movement needed for the floating annular seat elements 24, 25 and gate 18, while bridging the gap and maintaining the seals at all times (open, closed and during opening and closing). In the tongue and groove embodiments, the tongue and groove portions of the seal are sized to ensure the tongue is retained in the groove throughout the limited axial movement, and thus bridges the gap at all times. Likewise, in the bridge ring insert embodiments, the bridge seal insert and any groove(s) into which it is fit are sized to ensure the bridge seal insert is retained in the grooves throughout the limited axial movement, and thus bridges the gap and maintains the seals at all times. An interference fit for the bridge ring inserts is preferred to ensure a tight fitting relationship. As well, a convenient way to achieve tight fitting relationship between the tongue and groove portions of the seal is to use the tongue to form the groove into which it is to fit.

In FIGS. 2-21, the gap formed between the annular seat elements 24, and the seat pockets 20, 21 (or the carrier rings 32, 33 if present), is shown with gap on both sides of the gate 18. This exemplifies the sealing positions of the bridging seals in a neutral position (pressure equalized), after the gate is opened. In FIGS. 22-27, the gap is shown only on one side of the gate 18, to exemplify the sealing positions of the bridging seals during the closing action as the gate 18 and annular seat elements 24, 25 move (float) in a downstream direction.

It will be evident from the figures that the tongue and groove or bridge seals of this invention are designed to bridge the gap at the face between the annular seat elements 24, 25 and the radial base 22 of the seat pockets 20, 21 (or the carrier rings 32, 33 if present). Thus the tongue and groove or bridge seals of this invention extend perpendicularly across the face which is being sealed. The tongue and groove or bridge seals of this invention are particularly advantageous in keeping fines out of the sealing areas and for maintaining a seal even in low pressure environments.

Turning to the annular seat elements 24, 25, FIGS. 2-8, 11-25 show multiple preferred embodiments of the invention wherein at least two non-metallic seals are provided for the annular seat elements 24, 25. The first seal is a bridging seal shown as a tongue and groove seal (single or multiple) formed as a face seal on the seat pocket facing surface of the annular seat elements 24, 25. The secondary seal (second seal) for the annular seat elements 24, 25 is optional, but preferred.

The secondary seal may be formed in one or more of the following locations, as shown in FIGS. 2-25:

i) at the periphery 44 (outside facing edge facing toward the corner of the seat pockets 20, 21, i.e., opposite the flowbore edge) of the annular seat elements 24, 25 so as to form a corner seal (see FIGS. 2, 4-7, 12, 13, 15, 16, 23, 24 and 27);

ii) as a face seal on either side of the tongue and groove seal (see FIGS. 3, 17-21 and 25) to seal the annular seat elements 24, 25 to the radial base of the seat pocket or to the carrier rings; or iii) as an outside diameter seal to seal the annular seat elements 24, 25 to the side wall of the seat pocket or carrier ring if right cylindrical shaped (see FIGS. 8-11, 14, 22 and 26).

Multiple embodiments of the secondary seal are possible, as is known in the art to seal a face or corner, for example ring seals with shapes (in section) including O-rings seals, wiper seals, U-rings, C-rings, V-rings, rectangular or square ring seals etc. The figures show examples of several of these embodiments, but others will be evident to those skilled in the art, within the scope of the present invention. It should be understood that the shapes of these secondary ring seals may vary from a strict O-, U-, C- or V-cross section, these terms merely denoting the general shape of the cross section. Alternatively, the secondary seal might take the form of a second bridging or tongue and groove seal according the present invention when the secondary seal is located as a face seal.

Figure 9:
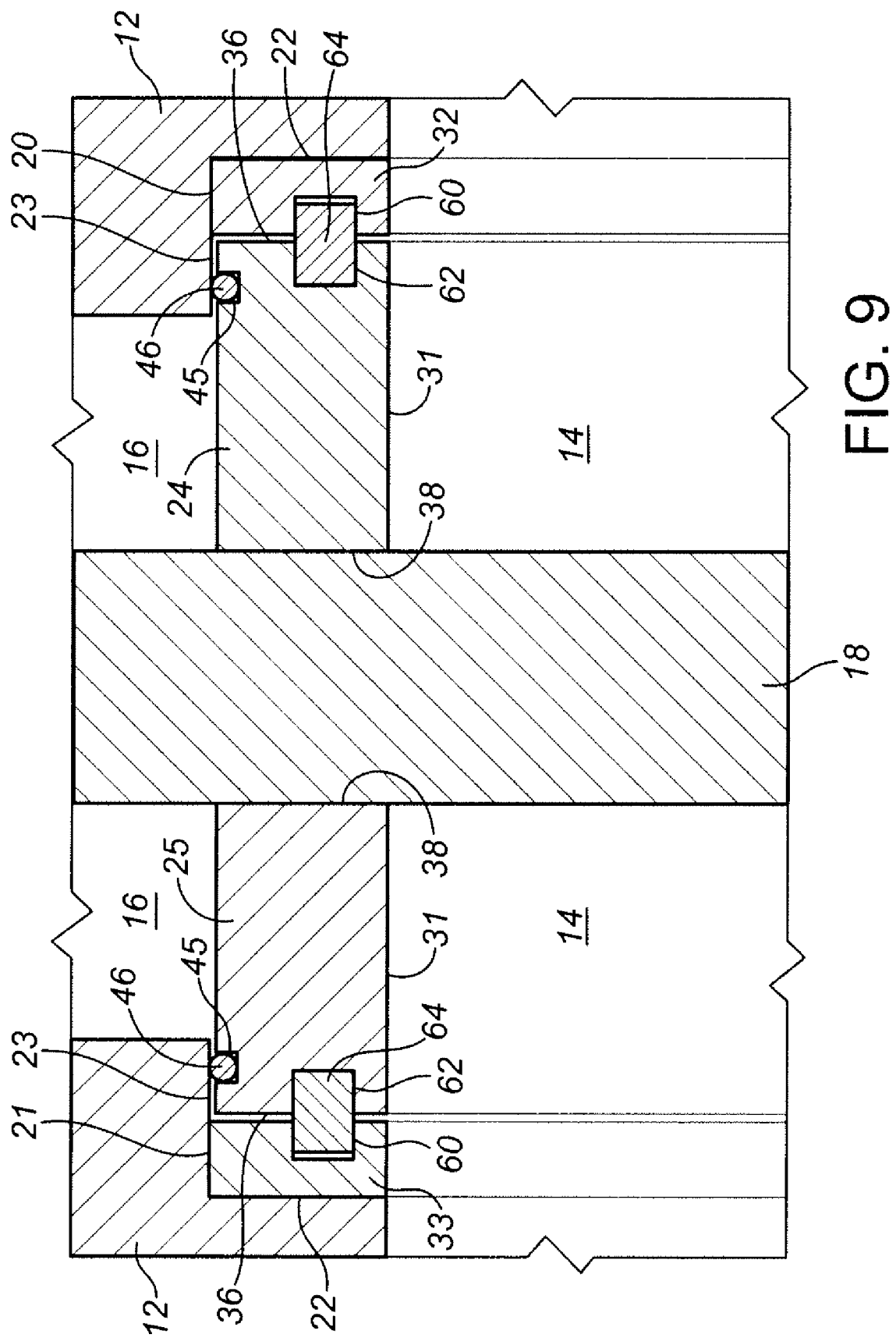
FIG. 9 is a side sectional view of the same area as FIG. 2, wherein a non-metallic bridging seal is provided as a face seal between the annular seat element and the carrier ring.
Figure 10:
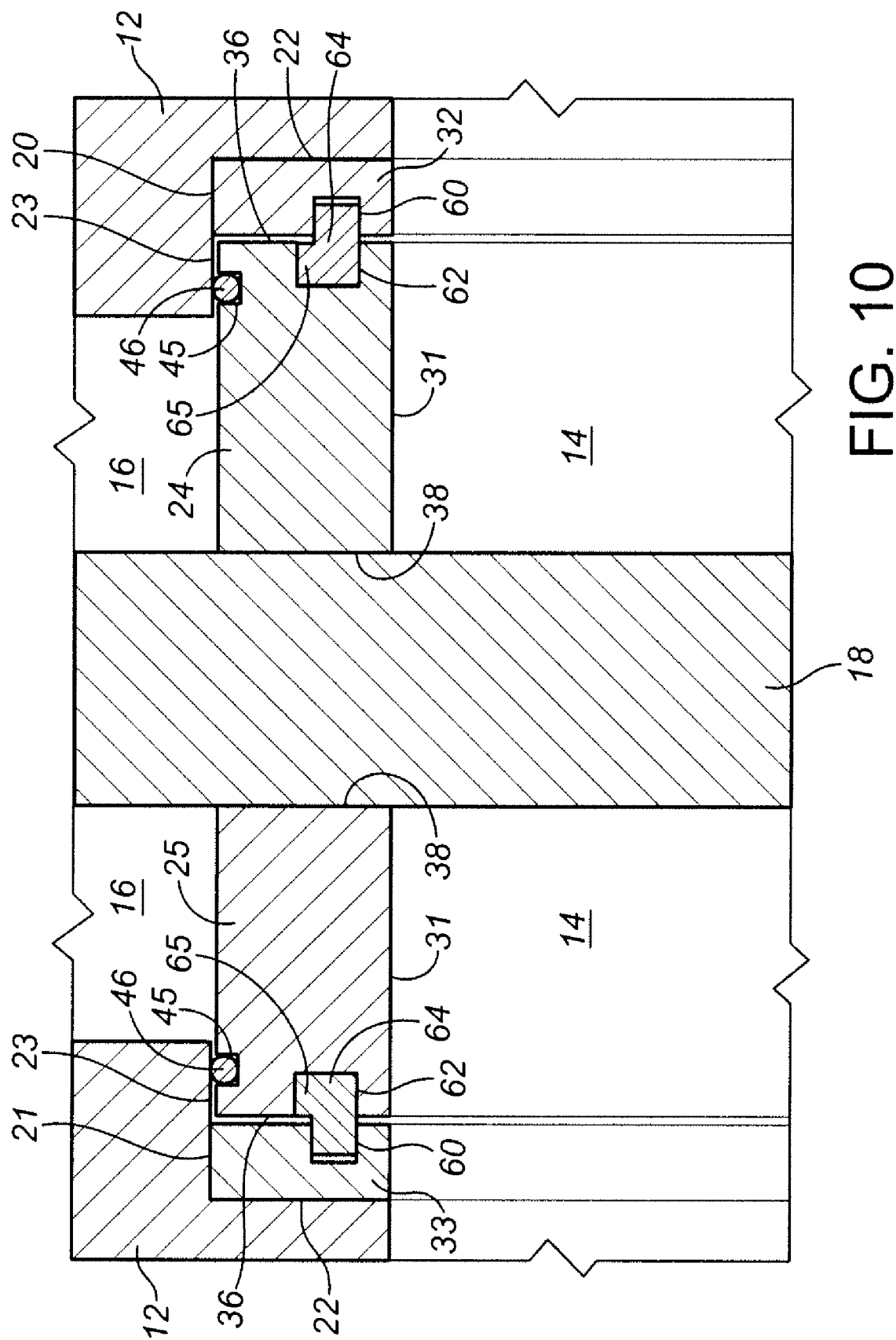
FIG. 10 is a side section view of the same area as FIG. 2, wherein a non-metallic bridging seal is provided as a face seal between the annular seat element and the carrier ring, but differing from FIG. 9 in that one of the annular grooves is radially larger than the other, with the bridge ring insert being likewise radially larger.
Figure 11:
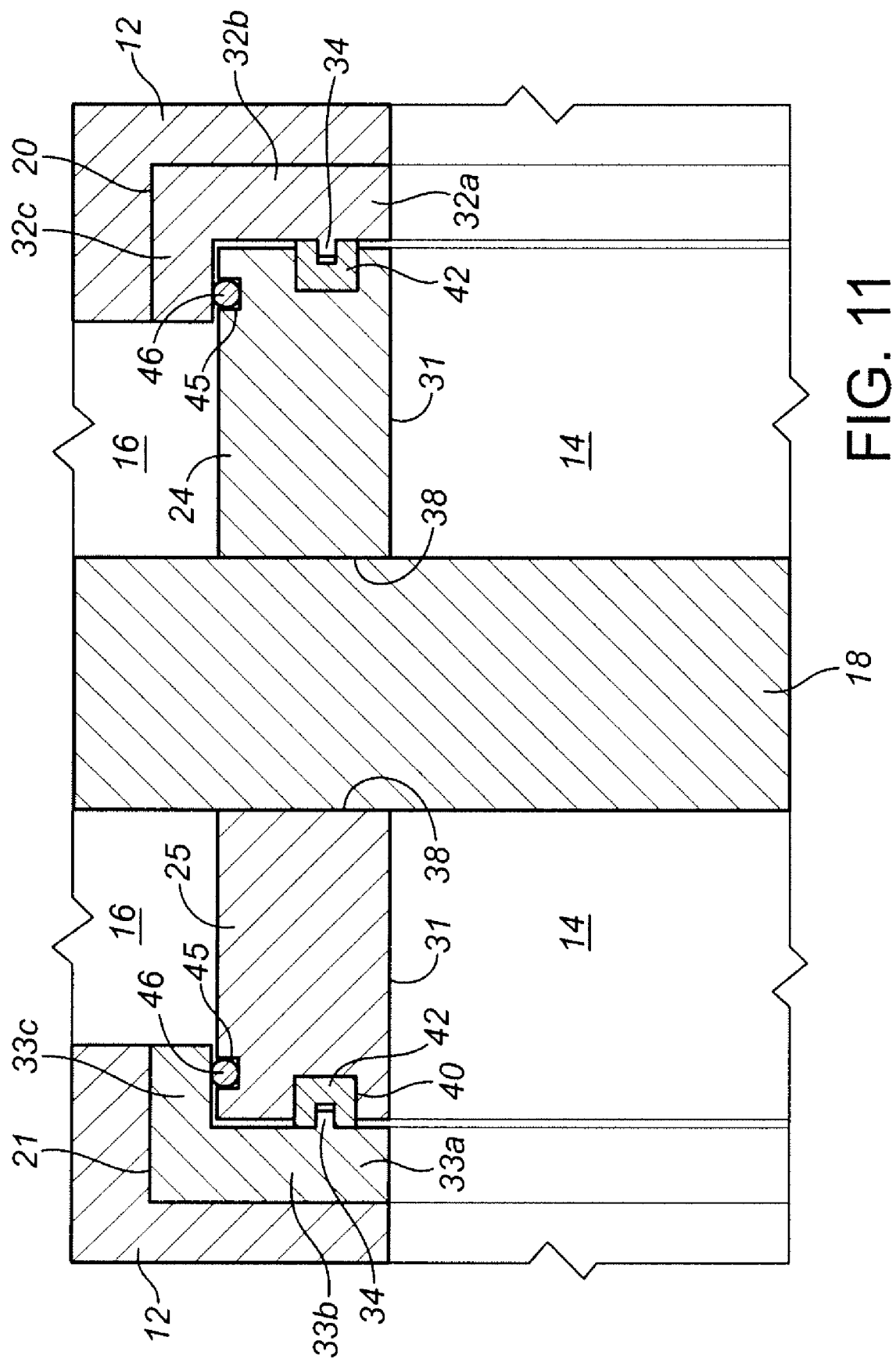
FIG. 11 is a side section view of the same area as FIG. 2, wherein the carrier ring is right cylindrical in its cross section for a tight interference fit within the right angled cylindrical counterbore (seat pocket) of the valve body, and wherein the secondary seal is an outside diameter seal to the side wall of the carrier ring.
Figure 26:
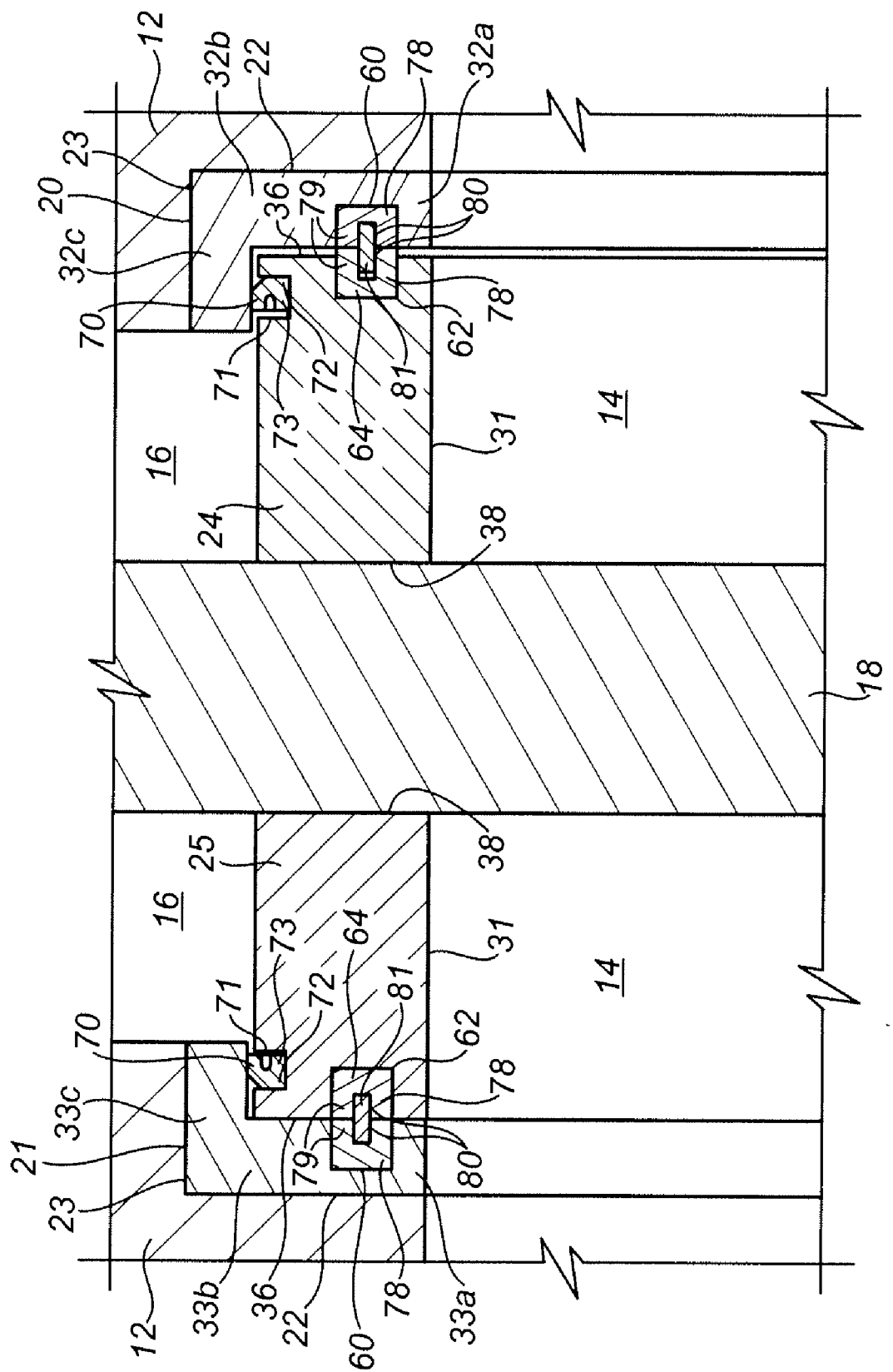
FIG. 26 is a side sectional view of the same area as FIG. 2, showing features similar to FIG. 14, but showing a non-metallic bridging seal formed as a face seal between the annular seat element and the carrier ring, the bridging seal comprising opposing, aligned U-shaped non metallic ring seals installed in both the annular seat elements and the carrier rings, and a rectangular ring insert held in the aligned grooves of the U-shaped ring seals.

FIGS. 9, and 10 illustrate the first seal (bridging seal) as a non-metallic bridge ring insert 64 for the annular seat elements 24, 25 in place of the tongue and groove seal shown in the other Figures. These embodiments are shown with a secondary seal formed as an outside diameter seal. Alternate embodiments of this bridging seal are shown in FIGS. 26 and 27, although the secondary seal in FIG. 27 is shown as a corner seal. Any of the above-described alternate locations for one or more secondary seals may be used.

FIGS. 2-28 are generally schematic in detail to illustrate the tongue and groove, bridge seal and optional secondary seal features of the present invention, other features of the gate valve of this invention being well understood and variable by persons skilled in the art. In FIGS. 2-27, the valve components are shown as preferably symmetrical, so that the valve is bidirectional, i.e., it will seal in both the upstream and the downstream directions. The annular seat elements 24, 25 are generally formed from a suitable metal such as carbon or alloy steels, or corrosion resistant alloys. Wear resistant coatings may be formed thereon as is known in the art. The annular seat elements 24, 25 are formed with a central bore 31 which is generally aligned with the flowbore 14.

Figure 17:
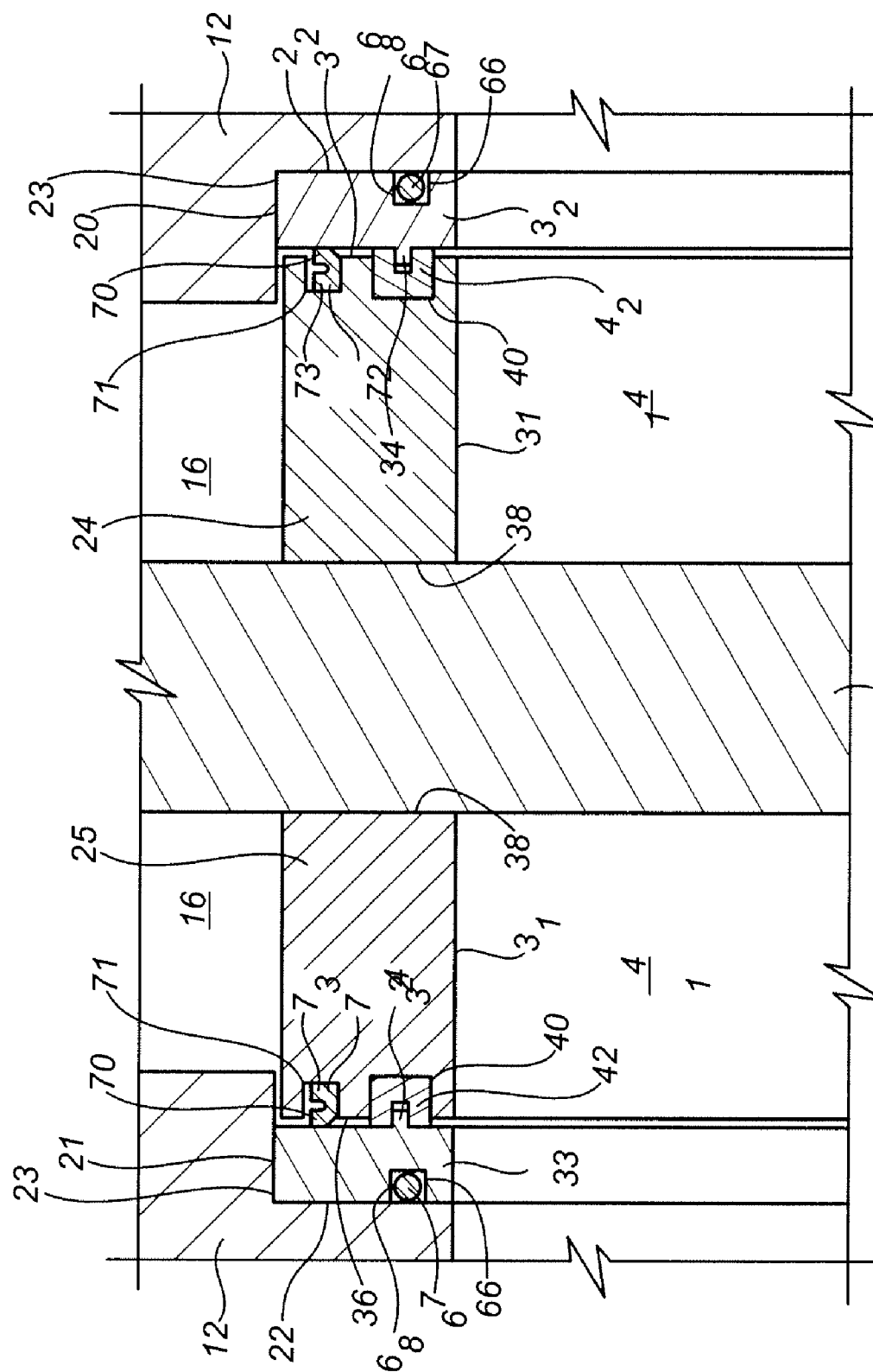
FIG. 17 is a side sectional view of the same area as FIG. 2, showing features similar to FIG. 3, but wherein an O-ring seal to the seat pocket is added. The secondary seal is provided by a U-ring seal installed in the annular seat element so as to form a second face seal.

In FIGS. 2, 3, and 5-27 optional metal carrier rings 32, 33 are mounted (interference fit) in the seat pockets 20, 21 respectively, for sealing relationship with the valve body 12. A metal-to-metal seal is provided by virtue of an interference fit between the metal carrier ring 32, 33, the radial base 22 and the side walls 23 of the seat pockets 20, 21. As seen in the Figures, the flowbore 14 is generally aligned through both the annular seat elements 24, 25 and the metal carrier rings 32, 33 as is known in the art. The metal carrier rings 32, 33 may be formed from suitable metals such as carbon, low alloy steels or corrosion resistant materials, as is known in the art. In FIGS. 2, 3, 5-10, 12-13, 15-21, 23-25 and 27, the carrier rings 32, 33 are shown to be annular shaped rings, while in FIGS. 11, 14, 22, and 26 the carrier rings (labeled as 32a and 33a) are shown to be right cylindrical (in cross section), having an annular base 32b, 33b and a side wall 32c, 33c for a tight interference fit in the right cylindrical seat pockets 20, 21 respectively. In the description below, and in the claims, the reference to the carrier rings 32, 33 applies equally to carrier rings 32a, 33a. In FIGS. 13 and 17, an optional ring seal 66 is shown between the carrier rings 32, 33 and the radial base 22 of the side walls 23 of the seat pockets 20, 21. This ring seal 66 is shown as an O-ring 67 held within an annular groove 68 formed in the carrier rings 32, 33. However, other ring seal types may be used, as is known in the art. This ring seal 66 prevents the carrier rings 32, 33 from being displaced from the seat pockets 20, 21. This ring seal 66 might be used in any of the illustrated embodiments with a carrier ring.

The Tongue and Groove Seal

In accordance with the present invention, one or more tongue and groove seals, described more fully hereinbelow, is formed between the annular seat elements 24, 25 and either the radial base 22 of the seat pocket 20, 21, or the metal carrier ring 32, 33 if present. In each of FIGS. 2-8, 11-15, 17, and 19 the tongue (annular lip 34) of each tongue and groove seal is formed either on the radial base 22, or on the metal carrier ring 32, 33, if present. However, it should be understood that this feature can be reversed, such that the tongue (annular lip 34) can be formed by the annular seat elements 24, 25, as shown in FIGS. 16, 18, 20 and 21, without departing from the present invention. Still alternatively, the tongue (annular lip 34) may be formed on a tongue-forming ring insert 75, installed in either the carrier rings 32, 33 (FIGS. 22, 23) or the annular seat elements 24, 25 (FIGS. 24, 25). If the carrier rings are not present, the tongue-forming insert ring 75 might be installed in the radial base 22 of the seat pockets 20, 21 (this embodiment not shown).

The gate valve 10 of the present invention preferably includes a secondary seal (i.e., in addition to the tongue and groove seal), described more fully hereinbelow.

In FIGS. 2-8, 11-15, 17, and 19, the radial base 22 of the seat pocket 20, 21, or the gate-facing surface of the metal carrier ring 32, 33 if present, is formed with a gate-facing annular lip 34 which serves as the tongue in the tongue and groove sealing arrangement of this invention. The seat pocket-facing surface 36 of the annular seat elements 24, 25, also termed the first seal surface, seats and seals against the radial base 22 of the seat pockets 20, 21, or against the carrier metal ring 32, 33, if present. The gate-facing surface 38 of the annular seat elements 24, 25 forms a second seal surface (opposing the first seal surface) for sealing against the gate 18. The first seal surface 36 of the annular seat elements 24, 25 is formed with an annular groove 40, sized to accept and retain a generally U-shaped non-metallic ring seal 42. The leg portions of the ring seal 42 extends beyond the annular groove 40, so as to protect the radial base 22 and first seal surface 36 when the annular seat element 24 or 25 is forced with pressure against the radial base 22, or the carrier metal ring 32 or 33 if present. The groove 40 and ring seal 42 are located to mate in tongue and groove sealing arrangement with the annular lip 34. An interference fit is preferred.

In FIGS. 16, 18, 20 and 21, the tongue and groove seal is shown in reverse, with the tongue being formed by a seat pocket-facing annular lip 34b on the annular seat elements, and the annular groove 40b being formed on the radial base 22 of the seat pockets 20, 21 (or on the carrier rings 32, 33, if present). A generally U-shaped non-metallic ring seal 42b, as described above for ring seal 42, is held and retained in the annular groove 40b. The groove 40b and ring seal 42b are located to mate in tongue and groove sealing arrangement with the annular lip 34b.

Figure 5:
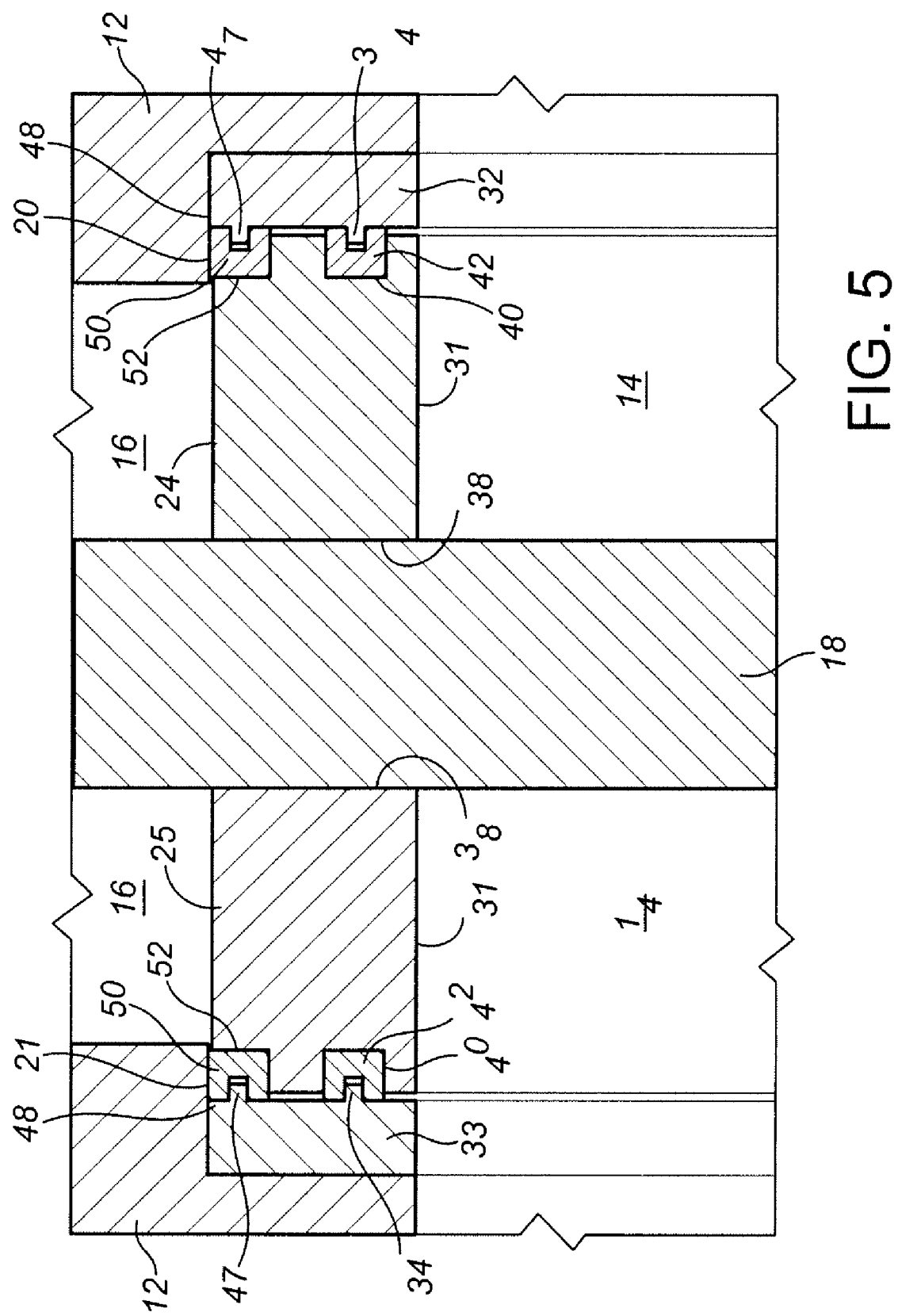
FIG. 5 is a side section schematic view of the same area as FIG. 2, wherein the secondary seal is provided by a tongue and groove seal located at the periphery of the annular seat elements to provide a corner seal with a generally U-shaped ring seal
Figure 7:
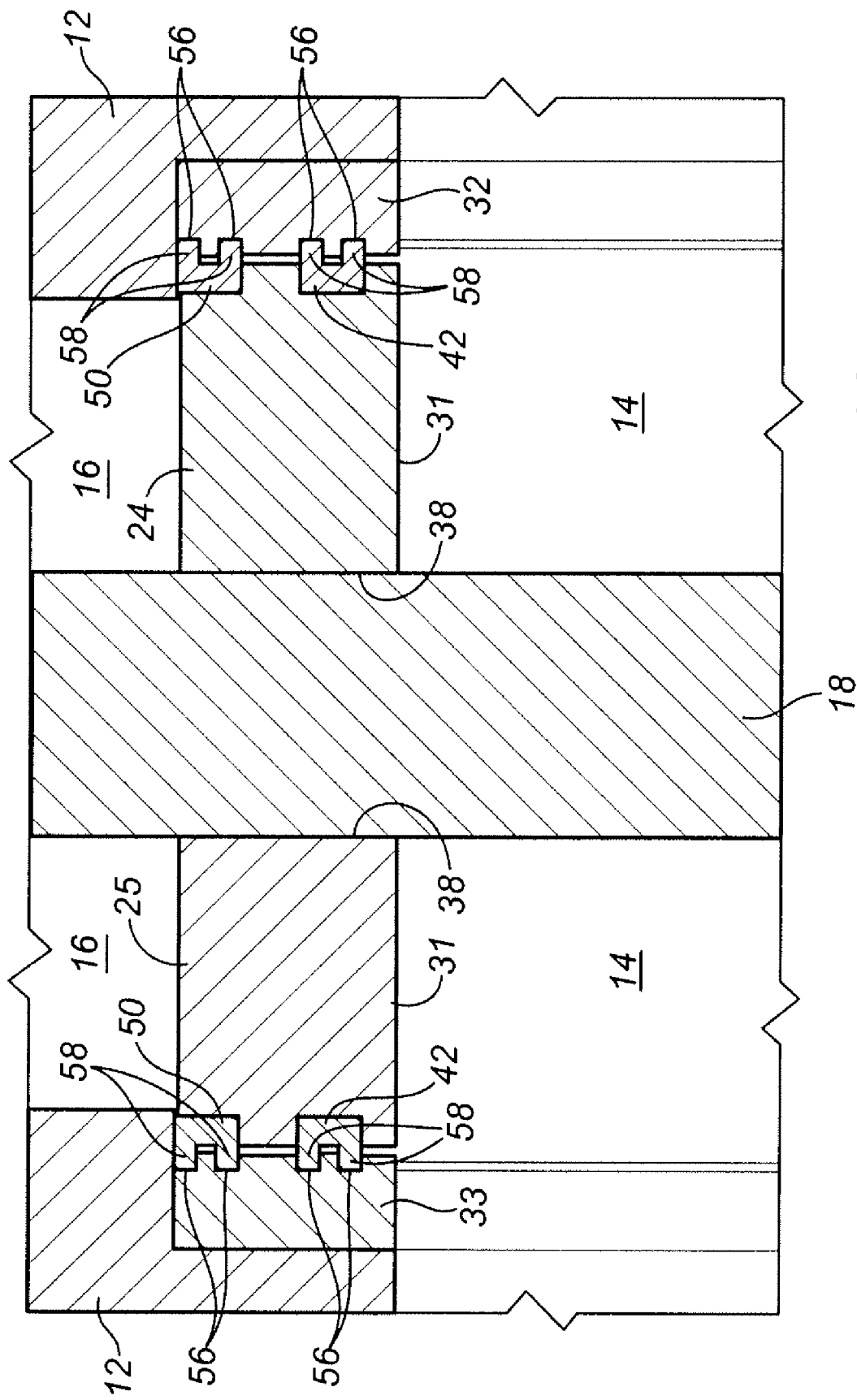
FIG. 7 is a side sectional schematic view of the same area as FIG. 2, with features similar to those in FIG. 5, but wherein the leg portions of the generally U-shaped ring seals of both of the tongue and groove seals extend into grooves in the metal carrier ring.
Figure 8:
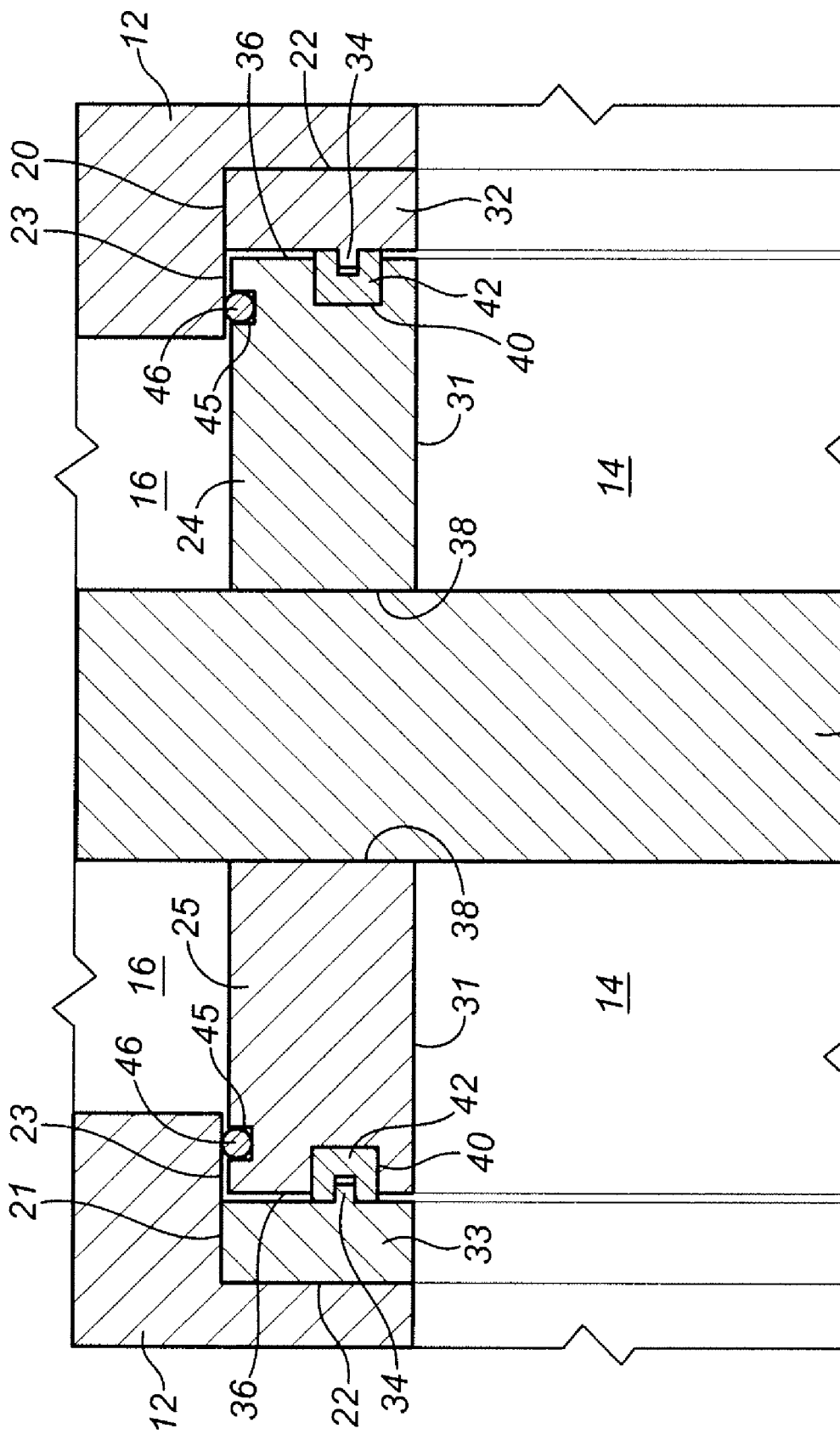
FIG. 8 is a side section schematic view of the same area as FIG. 2, wherein the secondary seal is an outside diameter seal provided by an O-ring seal located on the outside diameter of the annular seat element to seal against the side wall of the seat pocket.

FIG. 7 shows a further embodiment of the double tongue and groove seals of FIG. 5, in which the gate-facing surface of the metal carrier rings 32, 33 are formed with secondary annular grooves 56, positioned to accept the leg portions 58 of the generally U-shaped ring seals 42, 50. This preferred embodiment further enhances the exclusion of fines from the tongue and groove seals, and enhances the protection of the first seal surface 36 of the annular seat elements 24, 25. This embodiment ensures that the annular seat elements 24, 25 always remain in engagement with the tongue member of any of the tongue and groove seals to exclude fines and to protect the first seal surface 36. Stated in another way, this embodiment ensures that any gap to the annular seat elements 24, 25 is always bridged to exclude fines as the gate is opened or closed.

Figure 6:
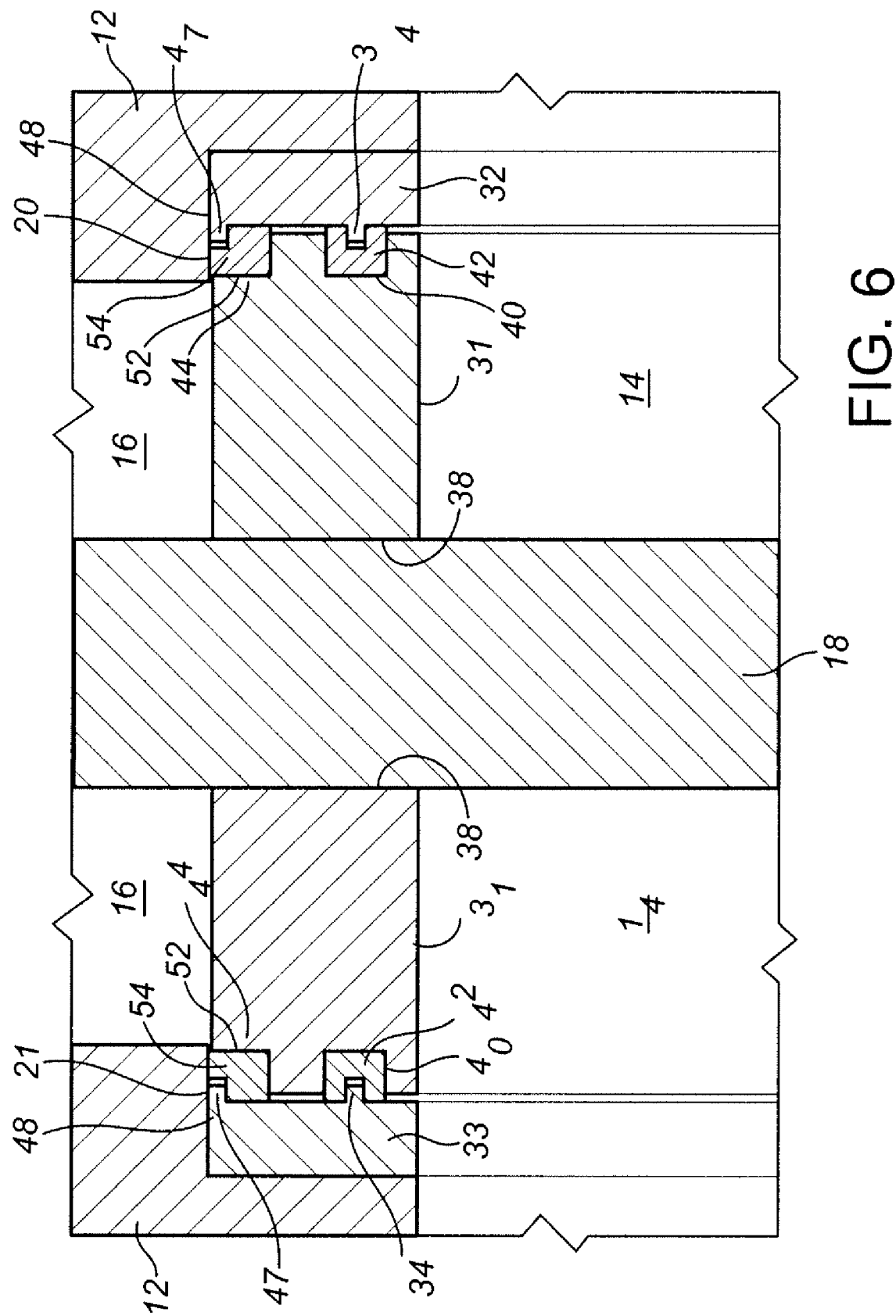
FIG. 6 is a side section schematic view of the same area as FIG. 2, wherein the secondary seal is provided by a tongue and groove seal located at the periphery of the annular seat element, with a generally L-shaped ring seal.
Figure 12:
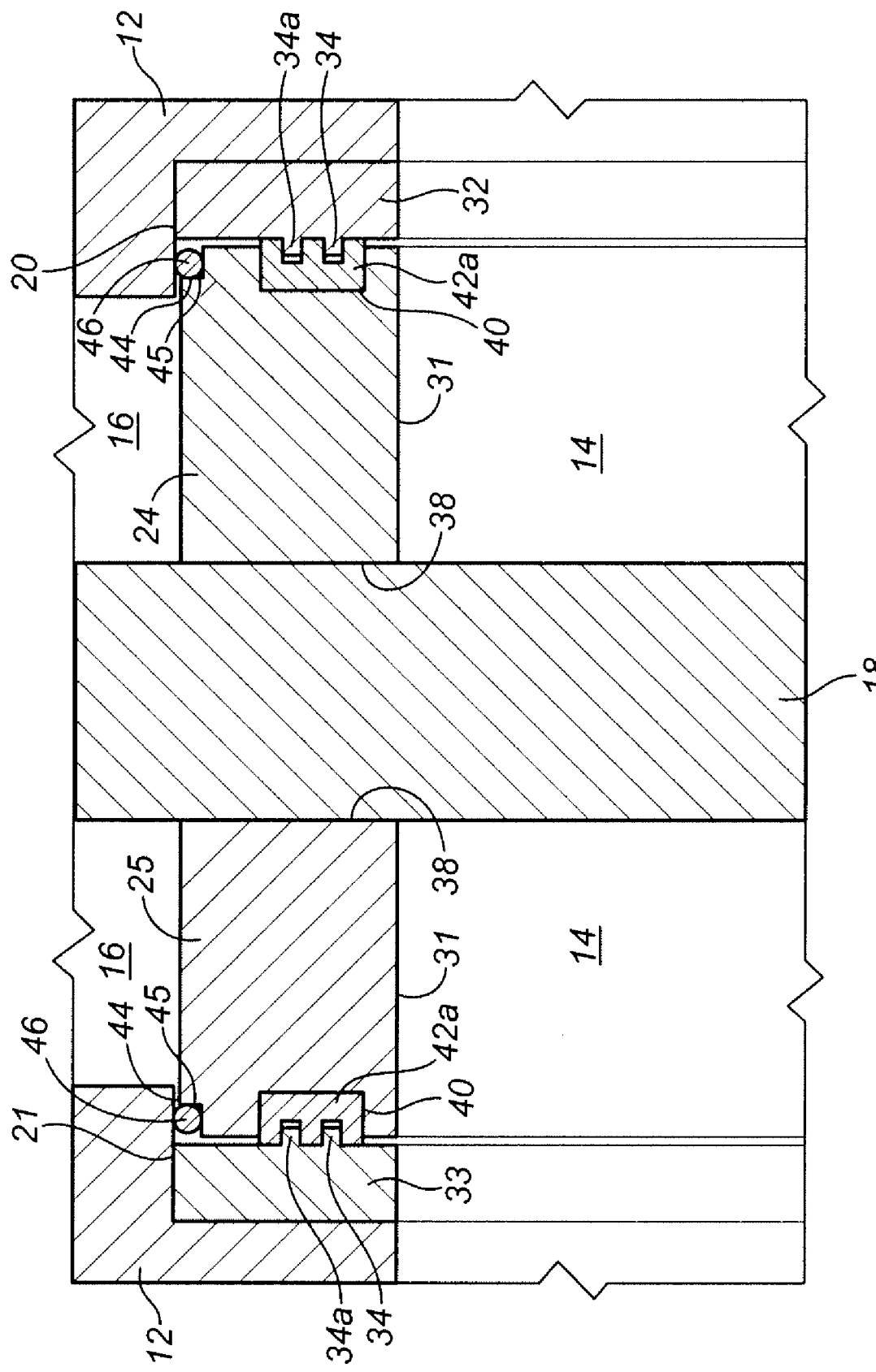
FIG. 12 is a side section view of the same area as FIG. 2, showing features similar to those shown in FIG. 2, but wherein the generally U-shaped ring seal provides multiple grooves (here a double U-shaped ring seal) to accept multiple tongues on the adjacent carrier ring and thus provide multiple tongue and groove seals.
Figure 13:
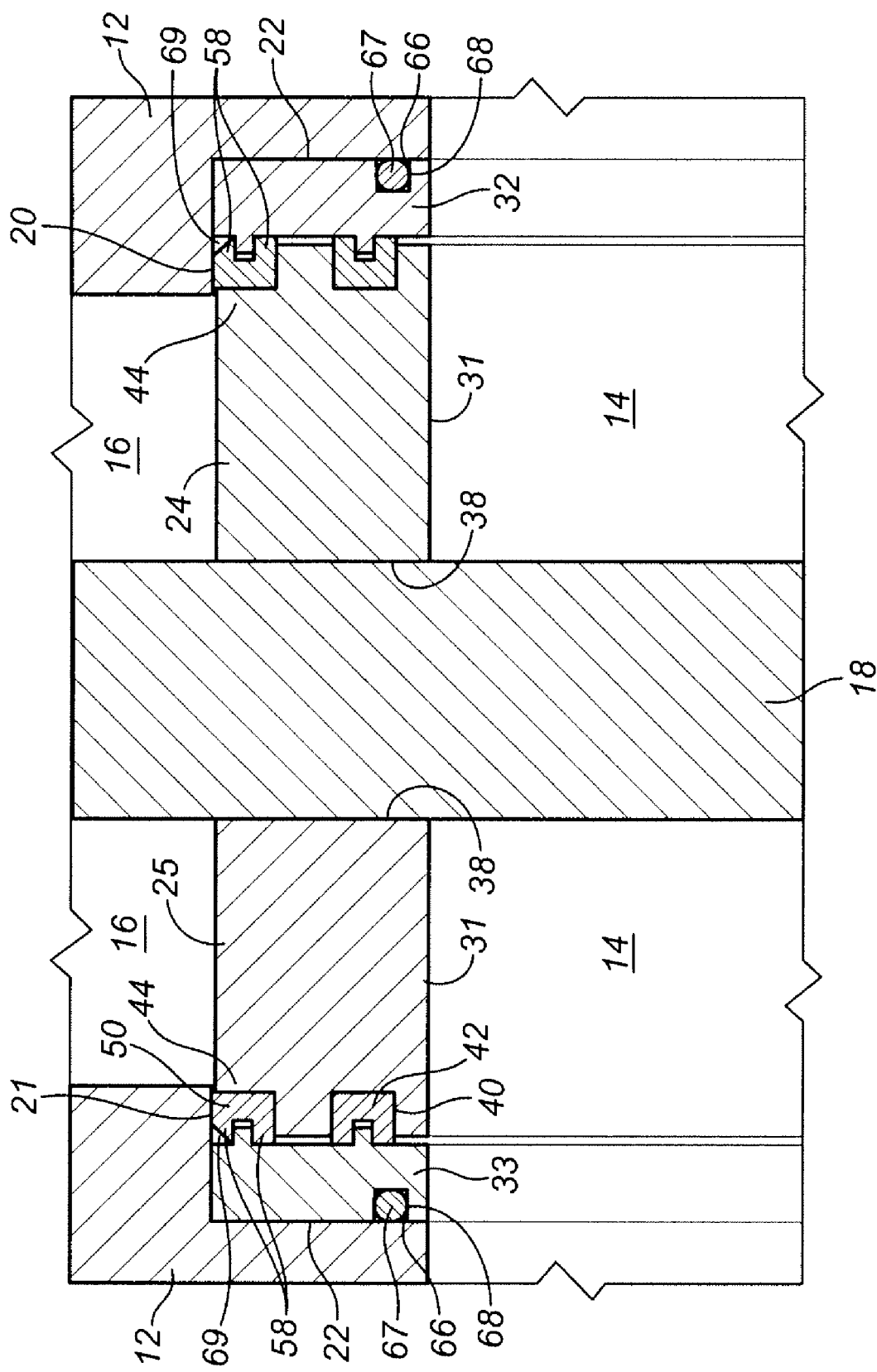
FIG. 13 is a side section view of the same area as FIG. 2, showing features similar to those shown in FIG. 5, but wherein an O-ring seal to the seat pocket is added and wherein the second tongue and groove seal located as a corner seal has a cut-away portion of one of the legs to assist in pressure equalization in this area during any sudden pressure drop across the valve.

In FIG. 12, a multiple tongue and groove seal is shown with the generally U-shaped ring seal 42a including multiple grooves (shown as a double U-shaped ring seal in the figure) to accept multiple tongues of annular lips 34, 34a. As described more fully below, the secondary seal may be a tongue and groove seal. In FIGS. 3, 5, 7, 13, a secondary tongue and groove seal is formed with annular lip 47, annular groove 49 and U-shaped ring seal 50. In FIG. 6, a secondary tongue and groove seal is formed with annular lip 47, annular groove 52 and L-shaped ring seal 54.

Figure 22:
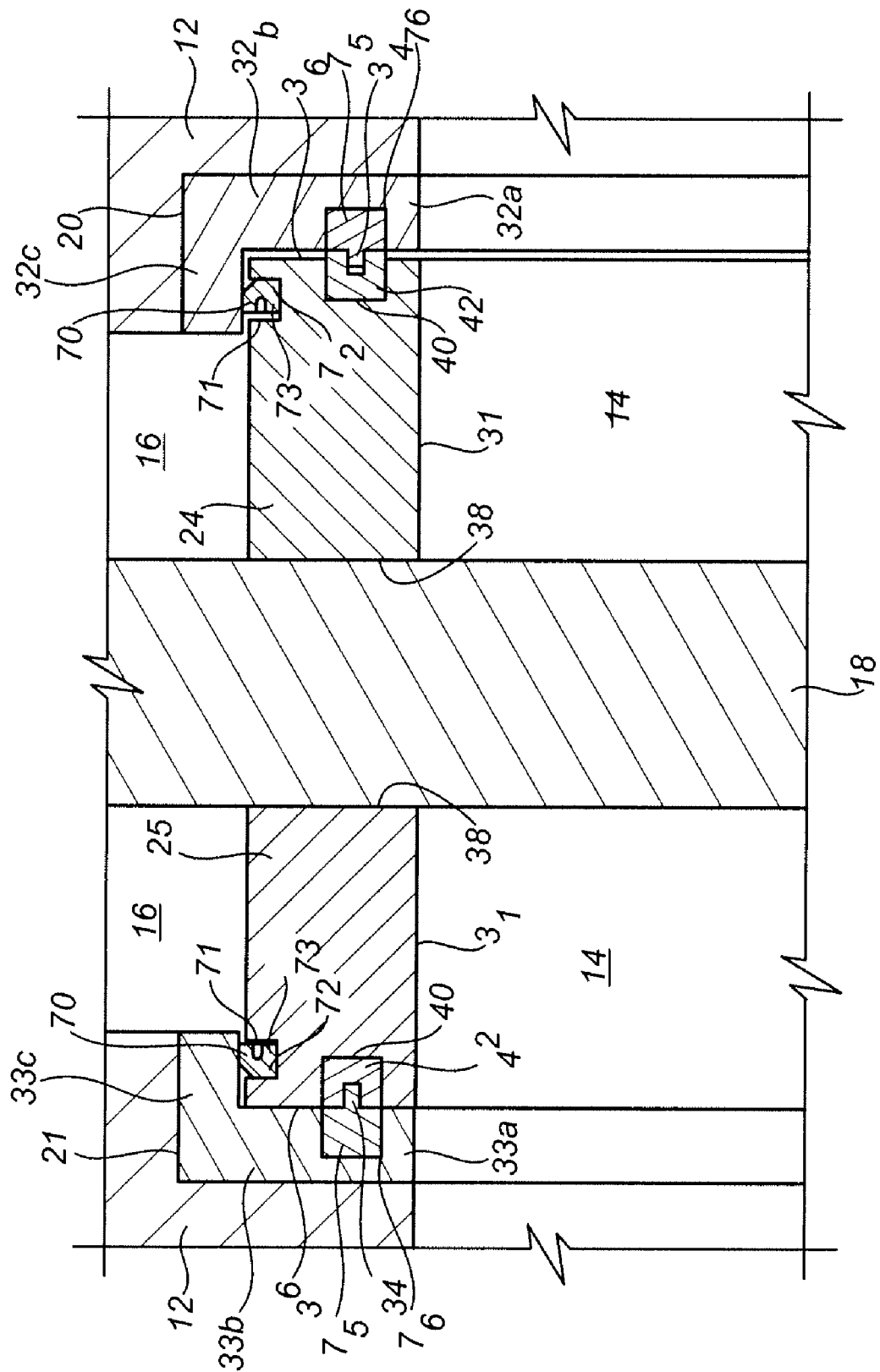
FIG. 22 is a side sectional view of the same area as FIG. 2, showing features similar to FIG. 14, but showing the tongue and groove face seal being formed with a tongue-forming ring insert installed in the carrier rings, with the tongue portion of the seal being formed by an annular lip on the ring insert.
Figure 23:
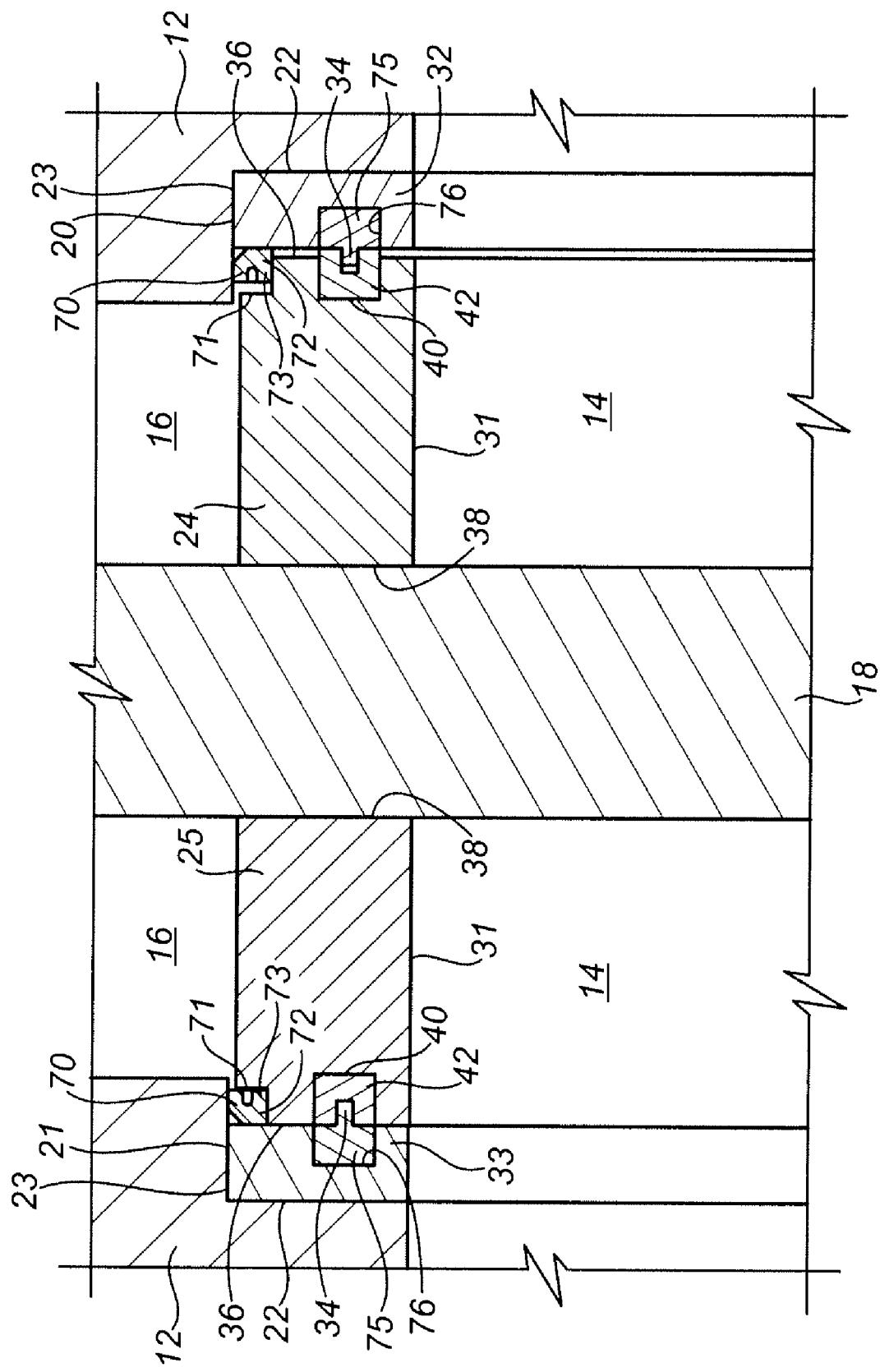
FIG. 23 is a side sectional view of the same area as FIG. 2, showing features similar to FIG. 15, but showing the tongue and groove face seal being formed with a tongue-forming ring insert installed in the carrier rings, with the tongue portion of the seal being formed by an annular lip on the ring insert.
Figure 24:
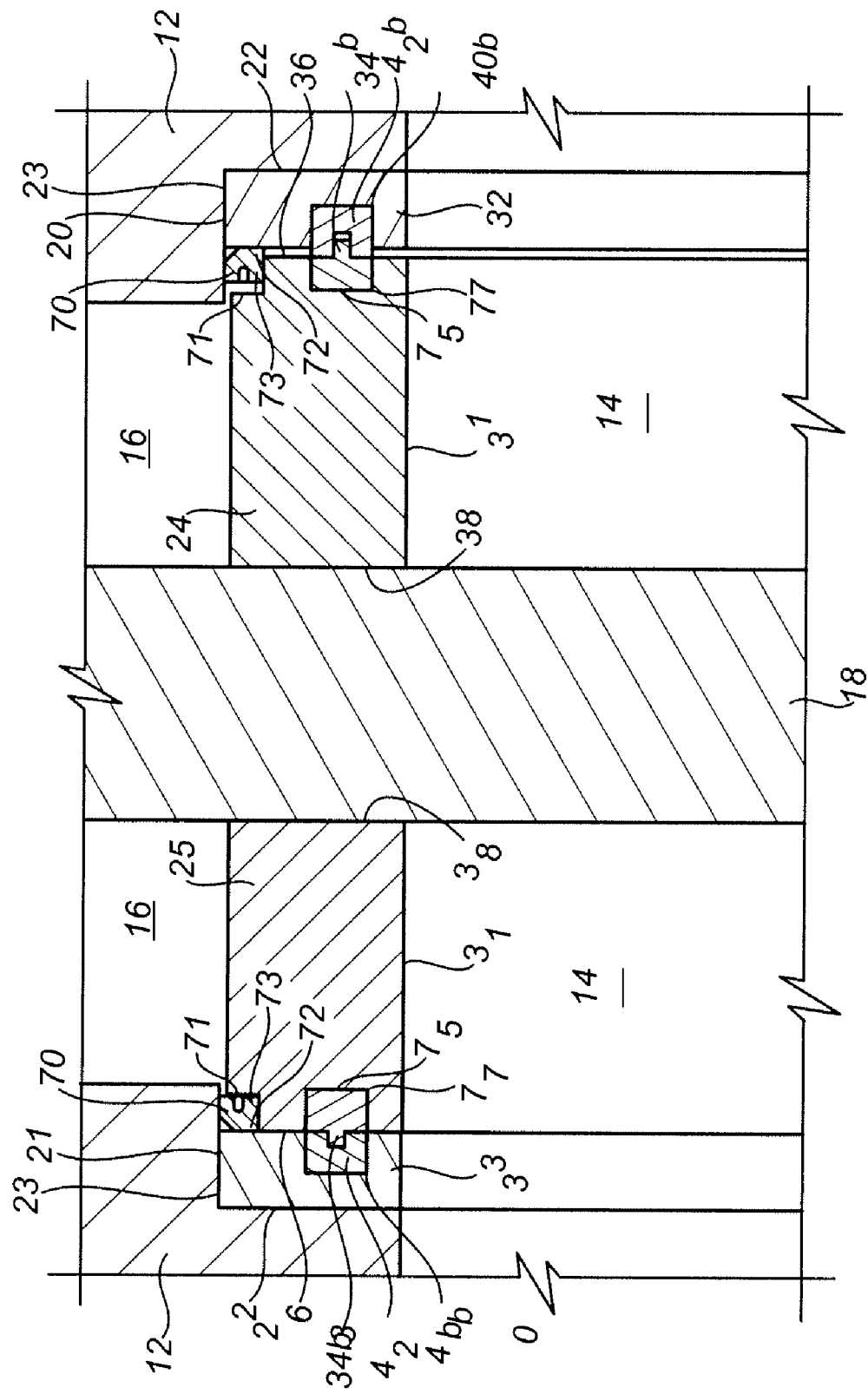
FIG. 24 is a side sectional view of the same area as FIG. 2, showing features similar to FIG. 16, but showing the tongue and groove face seal being formed with a tongue-forming ring insert installed in the annular seat elements, with the tongue portion of the seal being formed by an annular lip on the ring insert.
Figure 25:
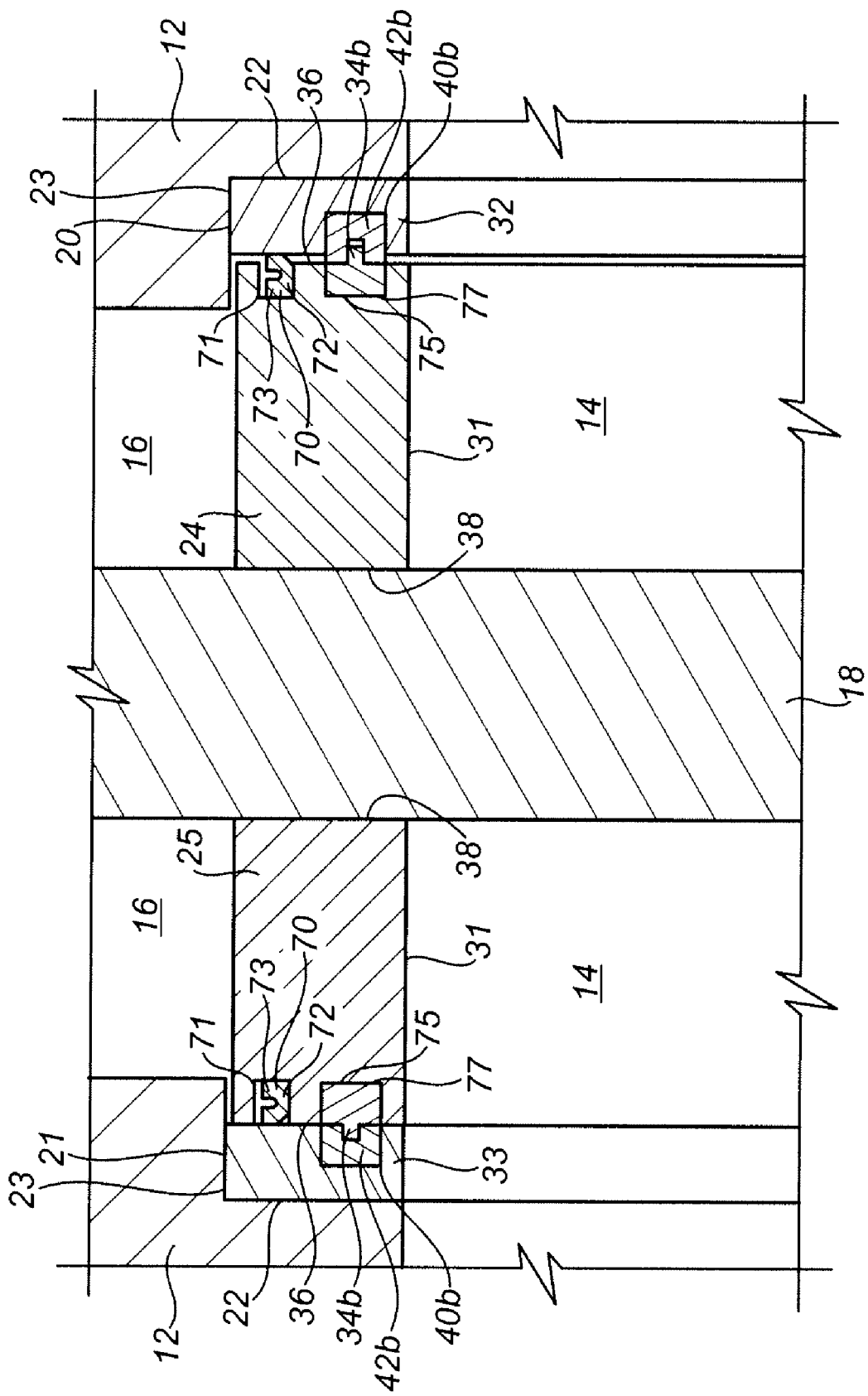
FIG. 25 is a side sectional view of the same area as FIG. 2, showing features similar to FIG. 18, but showing the tongue and groove face seal being formed with a tongue-forming ring insert installed in the annular seat elements, with the tongue portion of the seal being formed by an annular lip on the ring insert.

In FIGS. 22-25, the tongue of the tongue and groove seal is formed on a tongue-forming ring insert 75. In FIGS. 22, 23, the tongue-forming ring insert 75 is installed in ring insert grooves 76 formed in the carrier rings 32, 33 (or 32a, 33a). In FIGS. 24, 25, the tongue-forming ring insert 75 is installed in ring insert grooves 77 formed in the annular seat elements 24, 25. The ring insert grooves 76, 77 are formed to accommodate the tongue-forming ring inserts 75 in tight fitting relationship (interference fit preferred). The tongue-forming ring inserts 75 might be made from metallic or non-metallic materials (see below). The tongue of the ring inserts 75 is formed as an annular lip 34 or 34b, as described above. The annular lip 34 or 34*b* is accommodated in the non-metallic U-shaped ring seals 42 or 42*b*, in the manner described above for other embodiments.

To maintain the tongue and groove sealing arrangement of the present invention in a manner to exclude fines from entering therein, and to protect the first seal surface 36 of the annular seat elements 24, 25, the depth of the annular lips 34, 34*a*, 34*b*, 47 (i.e., the depth that the lip or tongue extends into any of the ring seals 42, 42*a*, 42*b*, 50 and 54), is greater than the axial movement that is permitted by the annular seat elements 24, 25, which equates to the sum of all gaps in this axis, as described above. As well, as noted above, the leg portions of the ring seals 42, 42*a* or 42*b* extend beyond the annular groove 40, 40*b*, 49 or 52, so as to protect the radial base 22 or carrier ring 32, 33 (32*a*, 33*a*) if present, and first seal surface 36 when the annular seat element 24 or 25 is forced with pressure against the radial base 22, or the carrier metal ring 32, 33 (32*a*, 33*a*) if present. As well, as shown in all of the Figures, the tongue is tight fitting in the generally U-shaped or L-shaped ring seals 42, 42*a*, 42*b*, 50 or 54.

The Secondary Ring Seal

A secondary non-metallic seal is preferably provided for the annular seat elements 24, 25. In general, any ring seal known in the art may be used, for example an O-ring seal, a U-ring seal, C-ring seal, a V-ring, rectangular or square ring seal, or a wiper seal. Exemplary and preferred embodiments of O-ring and U-ring seals are shown in the Figures, although the invention is not limited to these embodiments. Wiper seals are well known in the art, and may take a wide variety of shapes (see for example a variety of wiper seals available from Parker Seal Group, Irvine, Calif.). This secondary seal is termed a face seal if it is located between the tongue and groove seal and the periphery edge 44 of the annular seat elements 24, 25, or on the opposite side of the tongue and groove seal (i.e., on the flowbore side of the tongue and groove seal). This secondary seal may alternately be a corner seal if located at or adjacent the periphery edge 44. This secondary seal may still alternatively be an outside diameter seal if located on the outside diameter of the annular seat elements 24, 25 for sealing against the side wall 23 of the seat pockets 20, 21, as in FIGS. 8-10 (or against the side wall 32*c*, 33*c* of the right cylindrical carrier rings 32*a*, 33*a* in FIGS. 11, 14, 22 and 26). The secondary seal is formed by providing an annular recess or groove 45 in the annular seat elements 24, 25 at one of these locations, appropriately shaped to accept and retain a secondary ring seal such as shown in the Figures. This secondary seal may alternatively be formed by providing an annular recess 45*a* in the radial base 22 of the seat pockets 20, 21 (or in the carrier rings 32, 33, if present), particularly for the reverse tongue and groove design as shown in FIGS. 20, 21.

Figure 3:
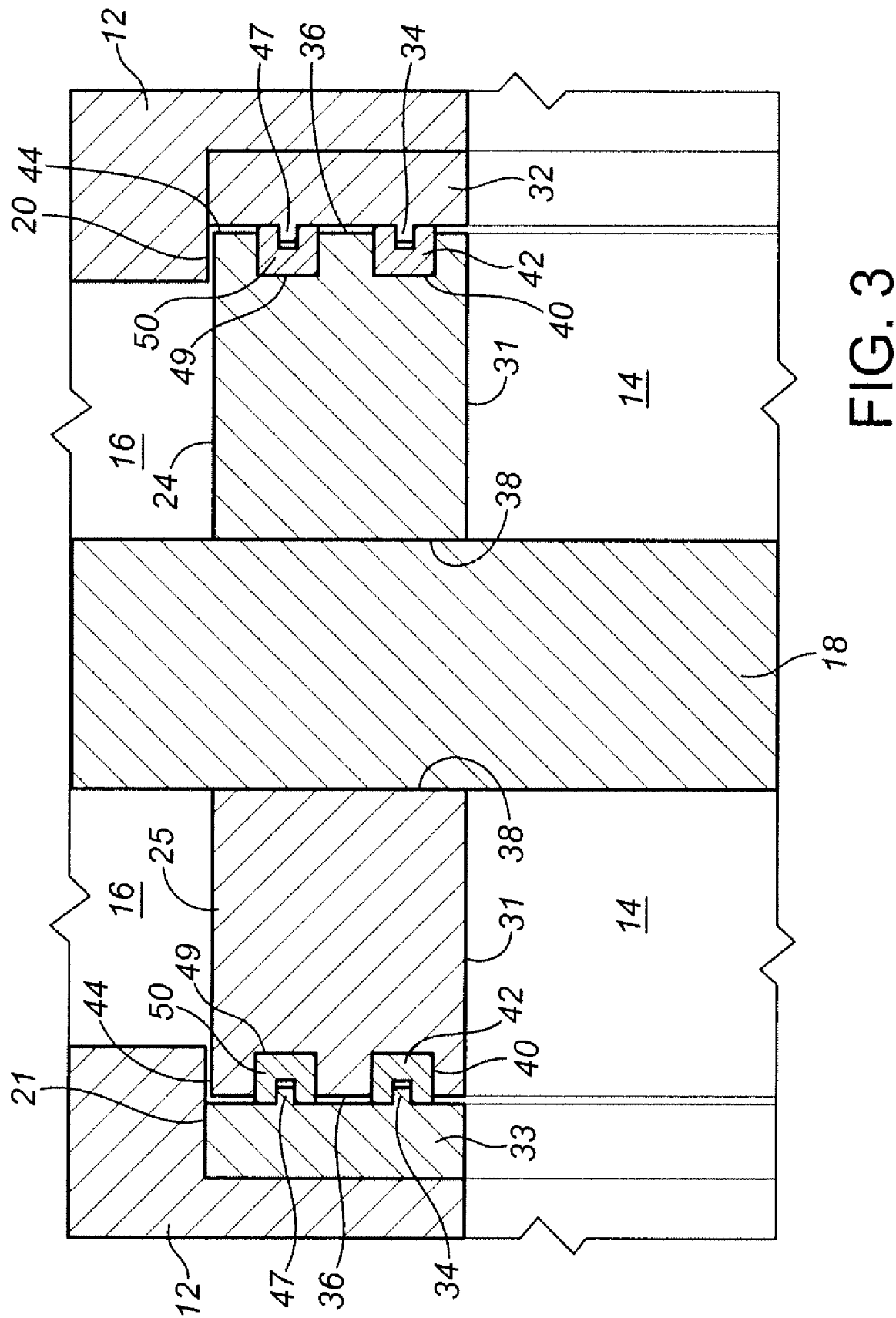
FIG. 3 is a side sectional schematic view of the same area as FIG. 2, wherein the secondary seal is provided by a second tongue and groove seal located on the face of the annular seat element so as to form a second face seal.
Figure 14:
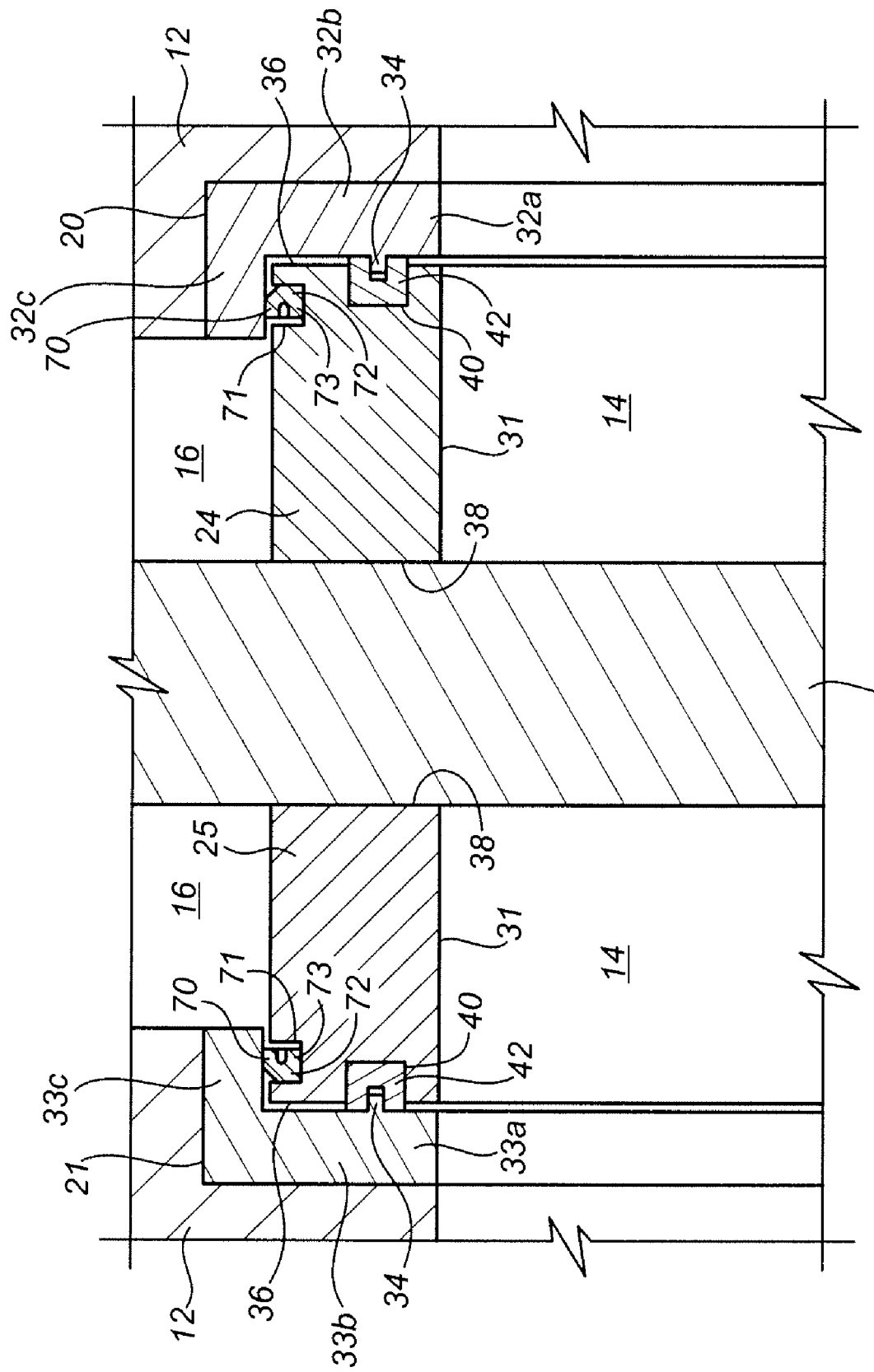
FIG. 14 is a side sectional view of the same area as FIG. 2, showing features similar to those of FIG. 11, but wherein the secondary seal is a U-ring seal located on the outside diameter of the annular seat elements to seal against the side wall of the seat pocket.
Figure 15:
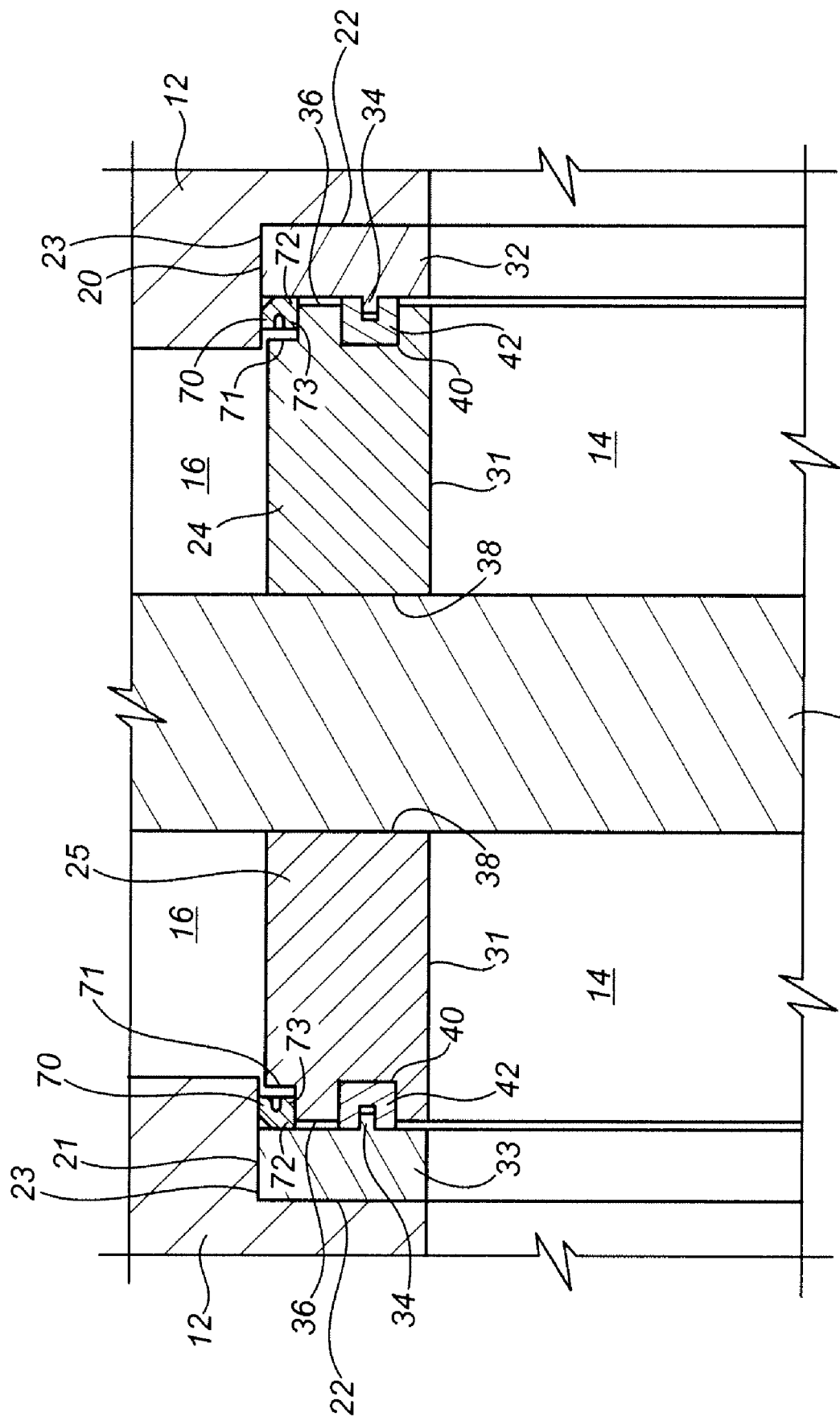
FIG. 15 is a side sectional view of the same area as FIG. 2, showing features similar to FIG. 2, but wherein the secondary seal is a U-ring seal located at the periphery of the annular seat element so as to form a corner seal.
Figure 16:
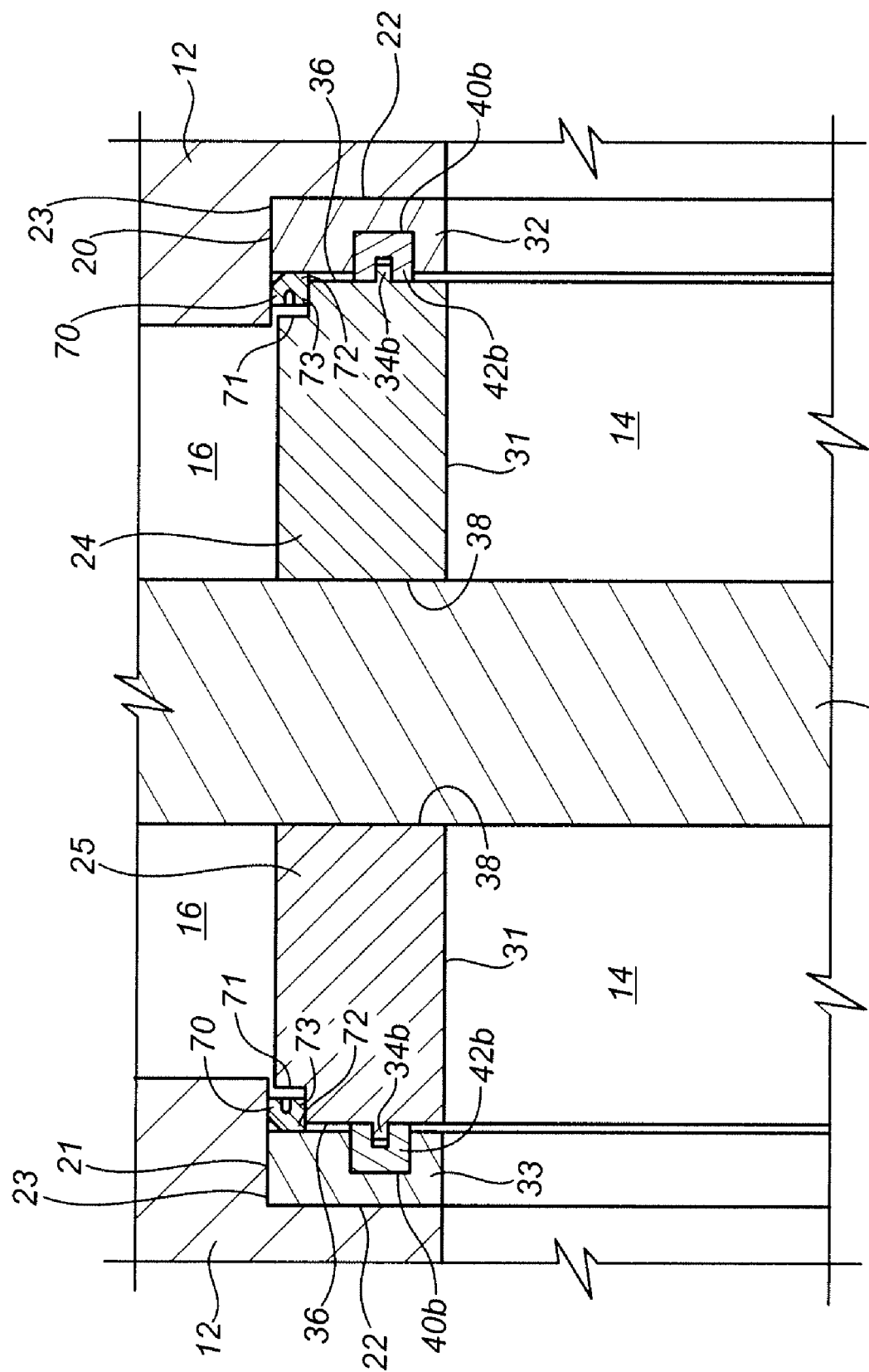
FIG. 16 is a side sectional view of the same area as FIG. 2, showing features similar to FIG. 15, but showing the tongue and groove face seal in the reverse mode from FIG. 15, wherein the tongue is formed on the annular seat element and the groove is formed by a generally U-shaped ring seal installed in the metal carrier ring. The secondary seal, as for FIG. 15 is shown to be a U-ring seal so as to form a corner seal.
Figure 18:
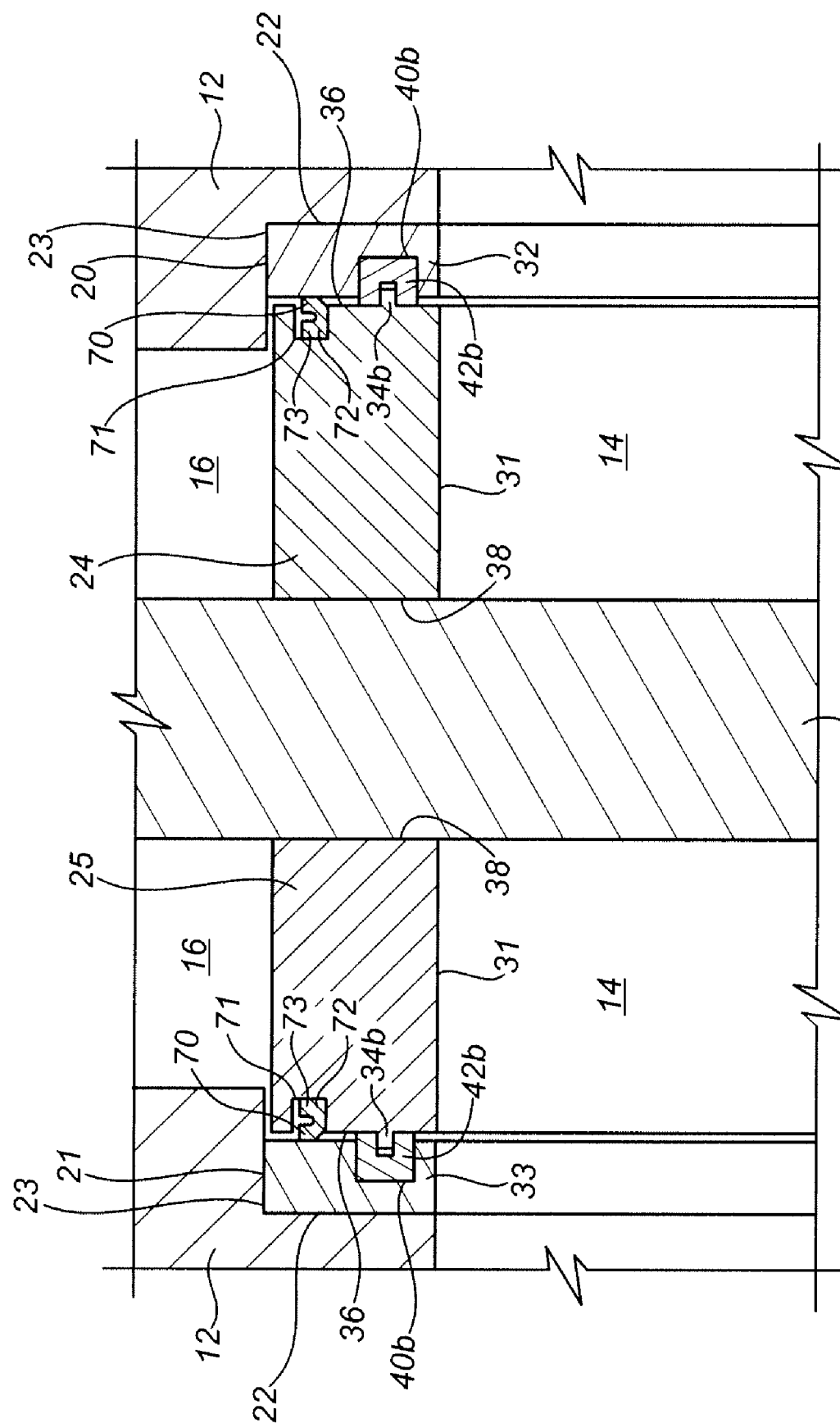
FIG. 18 is a side sectional view of the same area as FIG. 2, showing the tongue and groove face seal in the reverse mode, wherein the tongue is formed on the annular seat element and the groove is formed by a generally U-shaped ring seal installed in the metal carrier ring. The secondary seal is provided by a U-ring seal installed in the annular seat element so as to form a second face seal.
Figure 19:
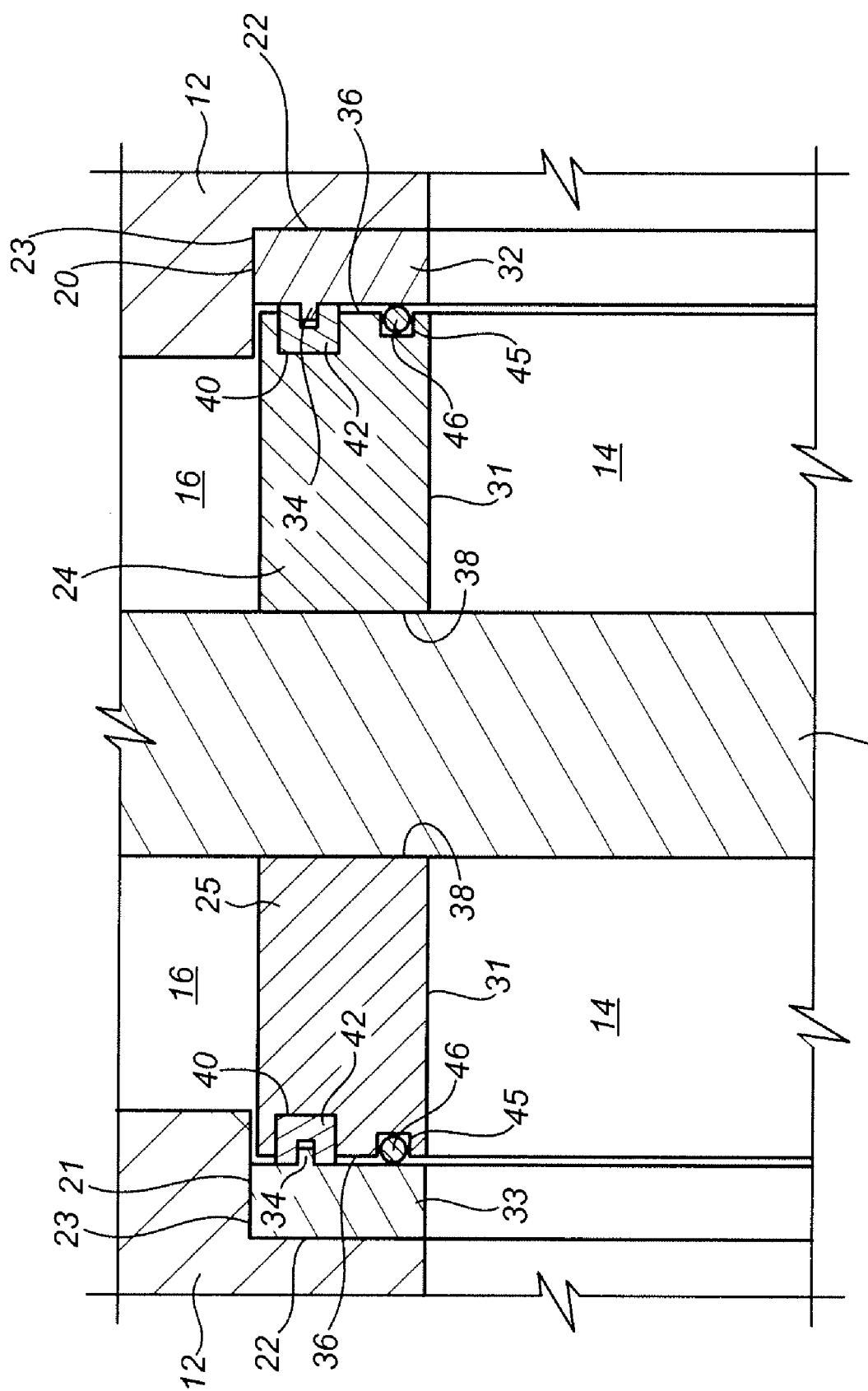
FIG. 19 is a side sectional view of the same area as FIG. 2, showing features similar to other figures, but showing the secondary seal as an O-ring seal installed in the annular seat element to form a face seal on the flowbore side of the tongue and groove seal.
Figure 20:
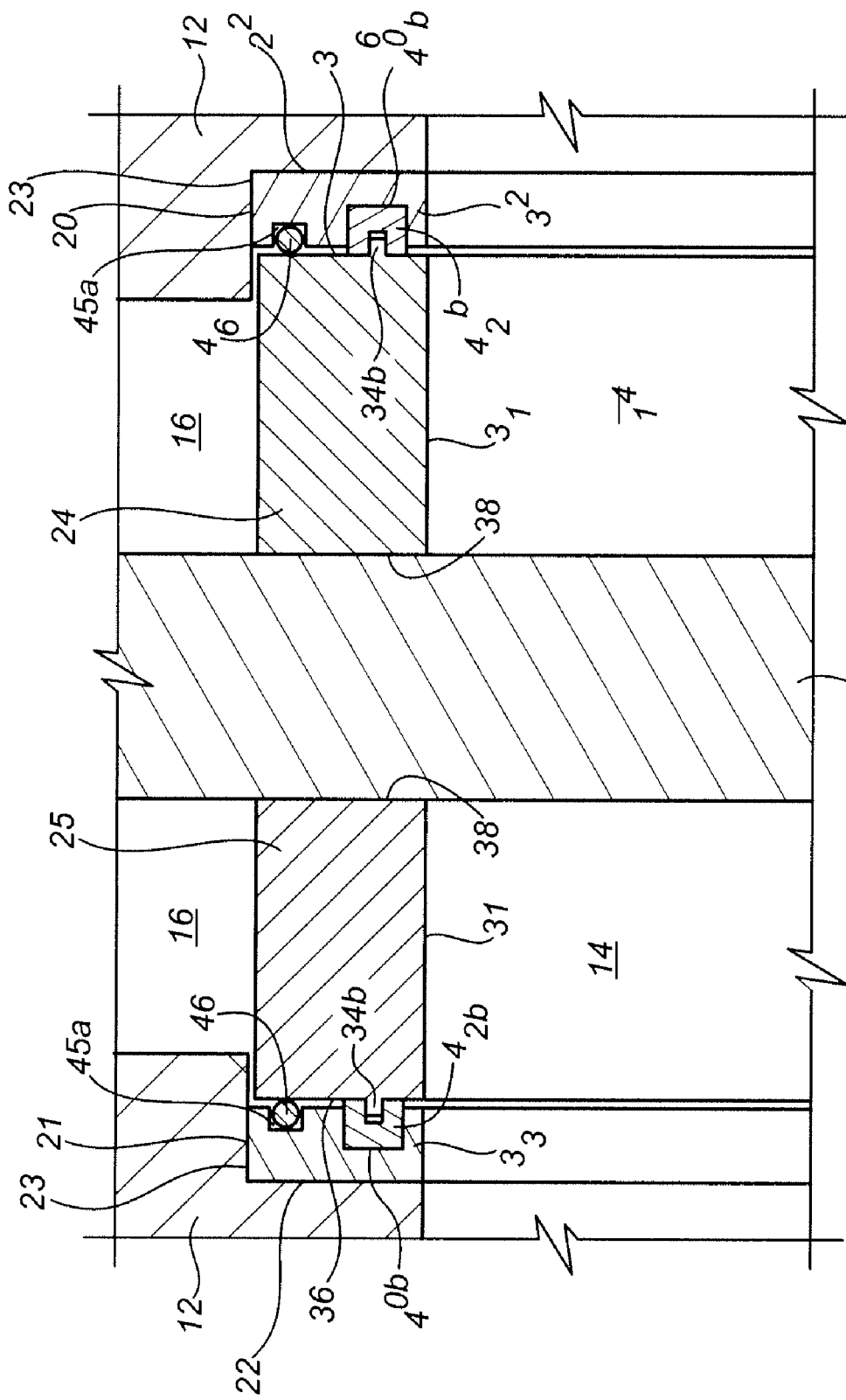
FIG. 20 is a side sectional view of the same area as FIG. 2, showing tongue and groove features in reverse mode to FIG. 19, and showing the secondary seal as an O-ring seal installed in the carrier ring to form a face seal on the outside of the tongue and groove seal.
Figure 21:
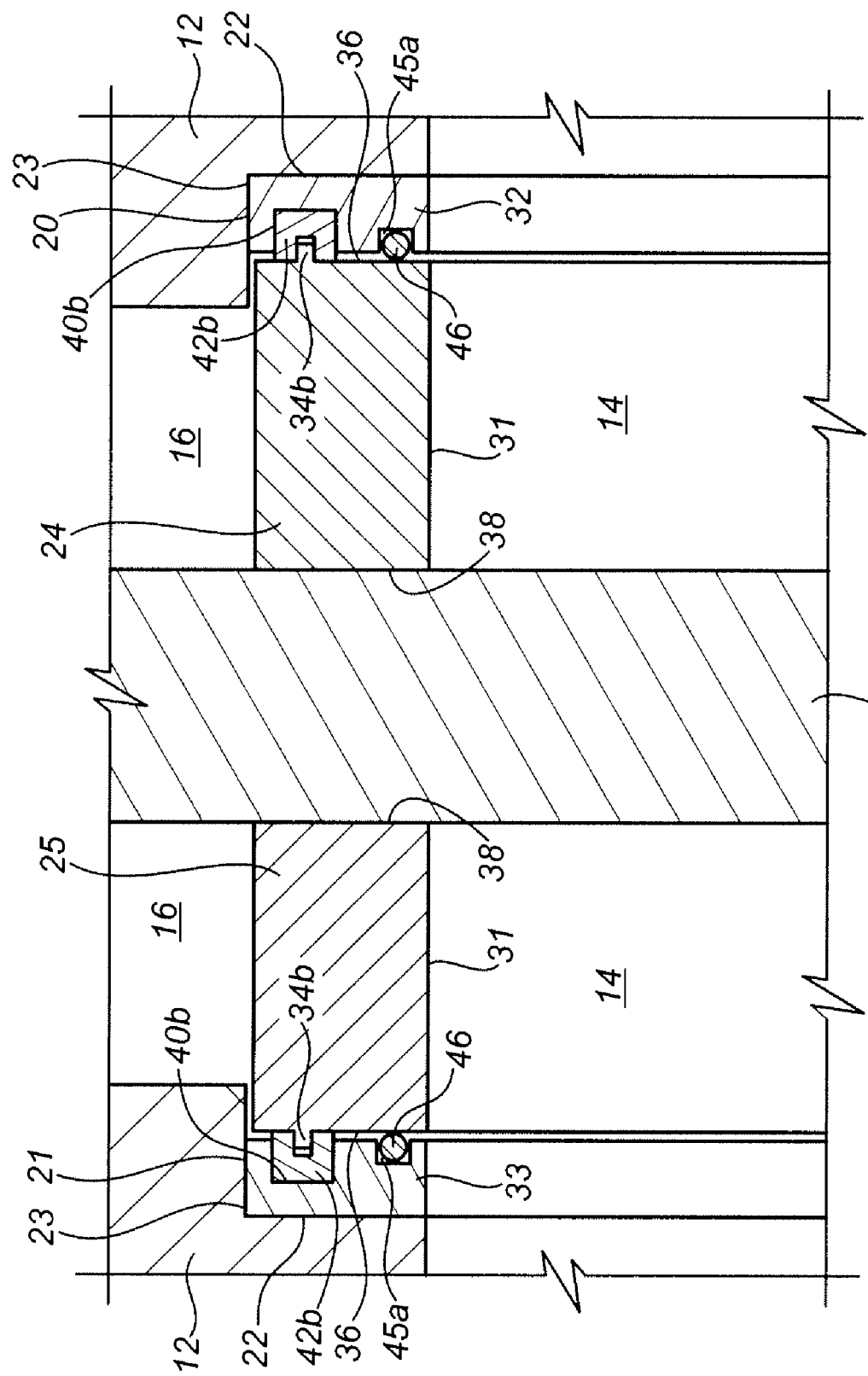
FIG. 21 is a side sectional view of the same area as FIG. 2, showing tongue and groove features in reverse mode to FIG. 19, and showing the secondary seal as an O-ring seal installed in the carrier ring to form a face seal on the flowbore side of the tongue and groove.

In the Figures, this secondary seal is shown in multiple embodiments to provide:

a) a face seal (see a secondary tongue and groove seal in FIG. 3, U-ring seal of FIGS. 17, 18, and 25, and O-ring seal of FIGS. 19, 20, 21);

b) a corner seal (see FIGS. 2, 4-7, 12, 13, 15, 16, 23, 24, and 27 for a corner secondary tongue and groove seal, a corner O-ring seal, or a corner U-ring seal); or c) an outside diameter seal (see FIGS. 8-11 for an O-ring seal held on the outside diameter of the annular seat elements, and FIGS. 14, 22 and 26 for a U-ring seal as an outside diameter seal).

A wiper seal might alternatively be located in any of these locations, although if used is most preferably located as a corner or outside diameter seal. In general, an O-ring corner seal such as shown in FIG. 2 or 4 might be best suited for relatively low pressure environments, say less than 10,000 psi, while a secondary tongue and groove seal such as shown in FIGS. 3 and 5, or the secondary U-ring seal of FIGS. 18, 24, 25 might be best suited for higher pressure environments, say greater than 15,000 psi.

Figure 2:
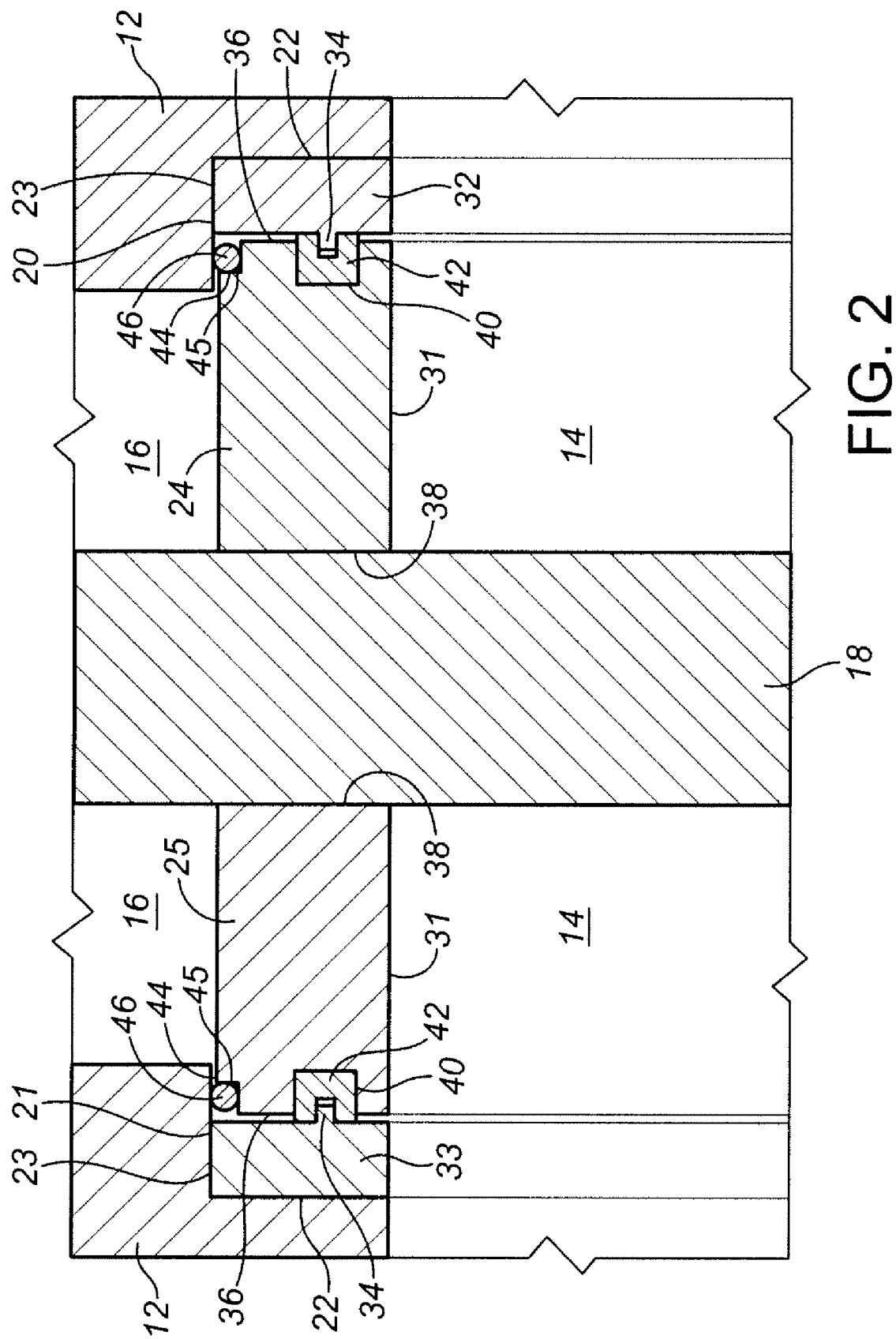
FIG. 2 is a side sectional schematic view showing details of the area marked 2 in FIG. 1 to illustrate one embodiment of the tongue and groove sealing feature forming a face seal. In this embodiment, the tongue is formed on a metal carrier ring, while the groove is formed by a generally U-shaped ring seal installed in the annular seat element. A secondary seal is provided by an O-ring seal located at the periphery of the annular seat element so as to form a corner seal.
Figure 4:
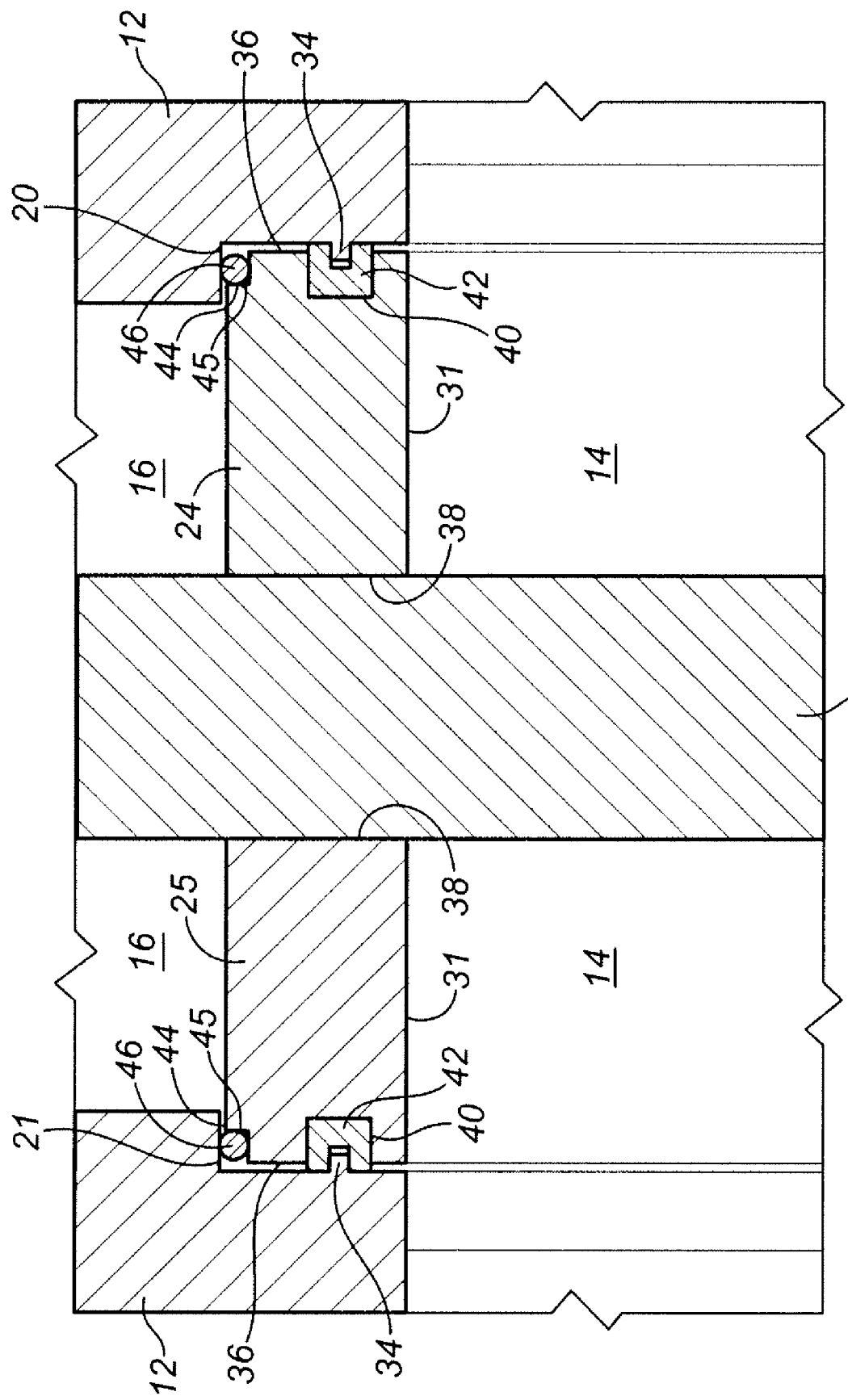
FIG. 4 is a side section schematic view of the same area as FIG. 2, but without the optional metal carrier ring of FIG. 2, such that the tongue is formed by the radial base of the seat pockets.

FIGS. 2, 4 and 12 show the corner seal to include an O-ring 46 located in annular recess or groove 45 at the periphery edge 44 of the annular seat elements 24, 25. To provide a secondary tongue and groove seal in other embodiments, this secondary seal is formed by providing a second, gate-facing annular lip 47 on the radial base 22 of the seat pockets 20, 21, or on the carrier rings 32, 33 if present. This second annular lip 47 may be located at the periphery edge 48 of the metal carrier rings 32, 33 to provide a corner seal as shown in FIGS. 5 and 6, or it may be located between the first tongue and groove seal and the periphery edge 48, as shown in FIG. 3. In the embodiments shown in FIG. 3, the annular recess 45 takes the form of a second annular groove 49 which is generally U-shaped, formed on the first seal surface 36. A second generally U-shaped ring seal 50 is provided in the second annular groove 49, the ring seal 50 being sized and located to accept the second annular lip 47 in a tongue and groove sealing arrangement. In the embodiments shown in FIGS. 5 and 6, the annular recess 45 takes the form of a generally L-shaped (in cross section) annular groove 52 at its periphery edge 44. A generally U-shaped ring seal 50 is provided in the groove 52 in FIG. 5, while a generally L-shaped (in cross section) ring seal 54 is provided in the groove 52, the ring seal 54 being sized and located to accept the second annular lip 47 so as to provide a corner seal. In FIGS. 8-11, the secondary seal is provided by forming the annular recess 45 in the outside diameter of the annular seat elements 24, 25, and locating the O-ring seal 46 therein. This forms an outside diameter or radial seal between the annular seat elements 24, 25 and the side wall 23 of the seat pockets 20, 21, or the side wall 32*c*, 33*c* of the right cylindrical carriers 32*a*, 33*a*.

In FIG. 13, the secondary seal is shown to take the form of a corner tongue and groove seal as described above for FIG. 5. In the embodiment shown in FIG. 13, this secondary seal is weakened slightly or shaped for venting, as compared to the first tongue and groove face seal. One way to weaken is with a cut away portion 69 from one of the legs 58 of the U-shaped ring seal 50. This cut away feature 69 is provided to allow pressure build up at the metal-to-metal seal surfaces between the two seals to dissipate more quickly, for instance in the event of a sudden pressure drop across the valve. This has the effect of lowering the operating torque on the gate valve. This secondary seal will preferably be weakened in this way at a location closest to the periphery 44 of the annular seat elements 24, 25.

In the embodiments described above, when the secondary seal takes the form of an O-ring seal, this seal may be weakened by scoring or notching the ring on its outside sealing surface. To prevent fines from entering the metal-to-metal sealing surface between the first and secondary seals, it is preferable to weaken only the secondary seal, and at a location closest to the periphery 44 of the seat elements 24, 25. This feature of weakening the secondary ring seal is more important on larger valves, where pressure build ups at the metal-to-metal sealing surfaces become larger due to the greater friction between the surfaces.

In FIGS. 14-18 and 22-27, the secondary seal is formed from a U-ring seal 70 held in an annular groove 71, located as an outside diameter seal in FIGS. 14, 22 and 26, a corner seal in FIGS. 15, 16, 23, 24 and 27, or a face seal in FIGS. 17, 18 and 25. The U-ring 70 may be formed of any non-metallic sealing material, but will most preferably be formed of a thermoplastic material such as a polytetrafluoroethylene (PTFE) based material such as Teflon®), or a polyetheretherketone (PEEK) based material. While the U-rings might be spring biased, when oriented as described below, and when made of these thermoplastic materials, it has been found that the spring biasing is not needed. The U-rings are shown to include a generally rectangular base portion 72, and leg portions 73. In order to prevent collapse or extrusion of the U-rings 70 under pressure, the U-rings 70 are oriented in the grooves 71 so as to face away or open away (i.e., with the leg portions 73 opening and facing away) from the tongue and groove seal, with one or both of the leg portions 73 (i.e., either or both of the sides or ends of the leg portions 73) making the seal to the adjacent sealing surface. Thus, in the outside diameter seal location of FIGS. 14, 22 and 26, the leg portions 73 are most preferably gate-facing (although they may less preferably be oriented to face against the side wall 23 of the seat pocket 20, 21 (or carrier ring 32, 33, if present)). In the corner seal locations of FIGS. 15, 16, 23, 24 and 27 the leg portions 73 are also most preferably oriented to be gate-facing (or they may less preferably be oriented to face the side wall 23 of the seat pocket (or carrier ring 32, 33, if present), or against the radial base 22 of the seat pocket (or carrier ring 32, 33 if present)). In the face seal locations of FIGS. 17, 18, and 25, the leg portions 73 are preferably oriented toward the side wall 23 of the seat pocket (or carrier ring, if present), or they may less preferably be oriented to face the radial base 22 of the seat pocket (or carrier ring 32, 33 if present). To assist in releasing pressure that may build up between the tongue and groove seal and the secondary seal, the secondary seal may be weakened or vented, as noted above. For the U-rings 70, these may be shaped for venting, for example as shown in FIG. 28, with a shape to allow one or both of the legs 73 to bend in order to vent pressure build up. In FIG. 28, the base 72 is machined away at a corner to allow the leg 73 most proximate that corner to bend for venting. This assists in pressure release. Alternatively, the leg portion(s) 73 may be formed with a cut away portion (not shown). Similar to FIG. 13, an additional O-ring seal 67 may be formed between the seat pockets 20, 21 and the carrier rings 32, 33, as shown in FIG. 17.

In FIGS. 19-21, the secondary seal may be a face seal formed from an O-ring seal 46, located and retained in an annular recess or groove 45 or 45a, located on either (or both) sides of the first tongue and groove seal. The O-ring 46 and recess 45 or 45a may be located in either the annular seat elements 24, 25, or in the radial base 22 of the seat pockets 20, 21 (or carrier rings 32, 33 if present). To assist in pressure release, as noted above, the secondary O-ring seal 46 may be weakened, for example by scoring. The O-ring seals 46 and 67 described above may be made of any non-metallic sealing material including elastomeric materials or thermoplastic materials.

As shown in FIGS. 19-21, the O-ring secondary seal might be provided on either side of the tongue and groove seal, although any of the alternate secondary seals might be substituted.

While the above embodiments illustrate only one secondary seal, in addition to the bridging seal (bridge seal or tongue and groove), it will be understood that multiple secondary ring seals to the annular seat elements 24, 25 may be included, at one or more of the locations described above.

The Bridge Ring Insert Seal

FIGS. 9 and 10 show an alternate non-metallic bridging seal embodiment of this invention for use instead of the tongue and groove seal described above. In this embodiment, aligned annular grooves 60, 62 are formed in the carrier rings 32, 33 and in the first seal surface 36 of the annular seat elements 24, 25. A non-metallic bridge ring insert 64 is located in these grooves 60, 62 for sealing engagement across the gap between the carrier rings 32, 33 and the annular seat elements 24, 25. In a manner similar to that described above for the tongue and groove seal, the insert 64 is held with a sufficient depth within the grooves 60, 62 such that this bridging seal maintains the sealing engagement across this gap at all times as the gate 18 is moved between its open and closed positions, while still permitting the limited axial movement of the annular seat elements 24, 25. This prevents fines from building up in this gap and ensures low pressure sealing.

In FIG. 10, the annular groove 62 in the annular seat elements 24, 25 is shown to be radially larger than the opposing groove 60 in the carrier rings 32, 33. Likewise, the bridge ring insert 64 is radially larger in the portion 65 which is inserted in the groove 62. In this embodiment, this radially larger portion 65 of the insert 64 provides a non-metallic sealing surface to the portion of the metal carrier ring 32, 33 directly opposed. This radially larger portion 65 of the insert 64 could be provided in the groove 60 on the carrier rings 32, 33 if desired.

The embodiments of FIGS. 9 and 10 are illustrated with the carrier rings 32, 33 present. However, the invention also extends to embodiments with carrier rings are as shown FIG. 11, and to embodiments in which the carrier rings are omitted. In the latter case, the annular groove 60 would be formed in the radial base 22 of the seat pockets 20, 21.

In FIGS. 26 and 27 the bridge ring insert 64 is formed from opposing, aligned U-shaped non-metallic ring seals 78 installed in both the annular seat elements 24, 25 and the carrier rings 32, 33 (or 32a, 33a). The U-shaped ring seals 78 are oriented and sized such that their leg portions 79 align and touch each other. In this manner, the grooves 80 formed within the leg portions 79 are also aligned to enclose a rectangular space into which a rectangular ring insert 81 is held in a tight fitting manner. In order to ensure a tight fitting relationship, the ring insert 81 might be used to form the grooves 80. The U-shaped ring seals 78 are held within grooves 60, 62 in the annular seat elements and carrier rings, in tight fitting relationship, with an interference fit being preferred. While the U-shaped ring seals 78 are non-metallic, the rectangular ring insert 81 may be metallic or non-metallic (if non-metallic, it is of a sturdy materials such as a thermoplastic). As for the above-noted embodiments, this multi-part bridge ring insert 64 is held with a sufficient depth within the grooves 60, 62 such that this bridging seal maintains the sealing engagement across this gap at all times as the gate 18 is moved between its open and closed positions, while still permitting the limited axial movement of the annular seat elements 24, 25. This prevents fines from building up in this gap and ensures low pressure sealing.

A secondary ring seal may be used with the bridging seal of this invention. Any ring seal known in the art may be used, or any of the embodiments as described above for the tongue and groove seal may be used. As above described for the tongue and groove embodiments, this secondary seal may be located as a face seal if it is located between the bridging seal the periphery edge of the annular seat elements 24, 25, or on the other side of the bridging seal (flowbore side). This secondary seal may alternately be a corner seal if located at or adjacent the periphery edge. This secondary seal may still alternatively be an outside diameter seal if located on the outside diameter of the annular seat elements 24, 25 for sealing against the side wall 23 of the seat pockets 20, 21 (or the carrier rings 32a, 33a, if present). The secondary seal is formed by providing an annular recess 45 in the annular seat elements 24, 25 (or in the seat pockets or carrier rings) at one or more of these locations, appropriately shaped to accept a secondary ring seal. In FIGS. 9 and 10, the secondary seal is shown to include an O-ring seal 46 located as an outside diameter seal in an annular recess 45 formed in the outside diameter of the annular seat elements 24, 25 to seal to the side wall 23 of the seat pocket 20, 21. In FIG. 26, the secondary seal is shown to be a U-ring 70, located as an outside diameter seal, as described above for the tongue and groove embodiments. In FIG. 27, the secondary seal is shown to be a U-ring 70, located as a corner seal, also as described above. Alternate secondary ring seals may be used, as described above for other embodiments shown in the Figures, or as will be apparent to one skilled in the art.

The ring seals 42, 42a, 42b, 46, 50 and 54 and the bridge ring inserts 64 (or U-shaped ring inserts 78) are non-metallic, generally made of suitable non-metallic seal materials such as elastomeric materials or thermoplastic materials. The tongue-forming ring inserts 75 are non-metallic or metallic. If non-metallic, the inserts 75 are generally made from a thermoplastic material such as polyetheretherketone (PEEK), with the opposing female member being made of a polytetrafluoroethylene (PTFE) based material. Most preferably, all of these seals are made from a thermoplastic material such as a PTFE based material (Teflon® being an example) or a PEEK based material. For the bridge ring seals of FIGS. 26 and 27, the U-shaped ring seals 78 may be of a non-metallic, preferably thermoplastic material, as above, and the rectangular ring insert 81 may be metallic or non-metallic of the materials noted above for inserts 75.

In the claims which follow, it should be appreciated that each of the above described tongue and groove seals, and the bridging seals function as a non-metallic bridging seal formed as a face seal between the first seal surface of each annular seat element and, either the radial base of the seat pocket, or the carrier ring if present. Each such bridging seal is adapted to bridge any gap formed at the first seal surface of the annular seat element such that sealing engagement is maintained across said gap at all times as the gate is moved between the open and closed positions, while still permitting the limited axial movement of the annular seat element.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

We claim:

1. A gate valve for controlling fluid flow, comprising:
   a valve body forming a cylindrical flowbore extending through the body and a gate cavity intersecting the flowbore to provide opposed openings into the flowbore, the valve body forming a seat pocket in each of the opposed openings, each seat pocket having a radial base and a side wall;
   an optional metal carrier ring mounted in sealing relationship to the valve body in each seat pocket;
   a gate slidably movable across the flowbore within the valve body between an open and closed position, and having a planar face on each side;
   a floating annular seat element mounted in each seat pocket for limited axial movement therein on opposite sides of the gate, each seat element forming opposing seal surfaces, including a first seal surface for sealing against the radial base of the seat pocket or against the carrier ring if present, and a second seal surface for sealing against the planar face of the gate, the annular seat element maintaining sealing engagement between the gate and the seat pocket, or the carrier ring if present, as the gate is moved between its open and closed positions; and
   a non-metallic bridging seal formed as a face seal between the first seal surface of each annular seat element and, either the radial base of the seat pocket, or the carrier ring if present, said bridging seal being adapted to bridge any gap formed at the first seal surface of the annular seat element such that sealing engagement is maintained across said gap at all times as the gate is moved between the open and closed positions, while still permitting the limited axial movement of the annular seat element.

2. The gate valve as set forth in claim 1, wherein the bridging seal is a tongue and groove seal formed between the first seal surface of each annular seat element and, either the radial base of the seat pocket, or the carrier ring if present, the tongue and groove seal maintaining sealing engagement within the seat pocket while still permitting the limited axial movement of the annular seat element.

3. The gate valve as set forth in claim 2, wherein:
   a) the tongue of the tongue and groove seal is provided by an annular lip formed on a metallic or non-metallic tongue-forming ring insert installed in the radial base of the seat pocket, or the carrier ring if present, and the groove is provided by a non-metallic generally U-shaped ring seal seated in a first annular groove provided in the first seal surface of the annular seat element opposite the annular lip; or
   b) the tongue of the tongue and groove seal is provided by an annular lip formed on a metallic or non-metallic tongue-forming ring insert installed in the annular seat element, and the groove is provided by a non-metallic generally U-shaped ring seal seated in a first annular groove provided in either the radial base of the seat pocket, or the carrier ring, if present, opposite the annular lip.

4. The gate valve of claim 3, wherein the tongue-forming ring inserts are held an interference fit with an annular groove formed in the radial base of the seat pocket, or the carrier ring if present.

5. The gate valve of claim 4, wherein the tongue-forming ring inserts are metallic.

6. The gate valve of claim 5, which further comprises:
a secondary non-metallic ring seal in the form of a U-ring located in an annular groove formed in the annular seat element, or in the seat pocket or in the carrier ring if present, the secondary ring seal being formed as one or more of:
i) a corner seal at or adjacent the periphery edge of each annular seat element;
ii) a face seal on the first seal surface of the annular seat element located on either or both sides of the non-metallic bridging seal; or
iii) an outside diameter seal at the outside diameter of the annular seat element.

7. The gate valve as set forth in claim 6, wherein each annular seat element is formed with a central bore aligned with the flowbore of the valve body.

8. The gate valve as set forth in claim 7, wherein the tongue of the tongue and groove seal extends into the groove with a depth that is greater than the limited axial movement permitted by the sum of all the gaps along the flowbore axis of the annular seat elements between the gate, the annular seat elements, the seat pockets and the carrier rings, if present.

9. The gate valve as set forth in claim 8, wherein the secondary ring seal U-ring has a base portion and leg portions, wherein the U-ring is oriented in the annular groove such that the leg portions open away from the tongue and groove seal.

10. The gate valve as set forth in claim 9, wherein the secondary ring seal U-ring is shaped so as to vent pressure build up between the tongue and groove seal and the U-ring.

11. The gate valve as set forth in claim 10, wherein the U-shaped ring seals of the tongue and groove seal and the secondary ring seal U-rings are formed of a thermoplastic material.

12. The gate valve as set forth in claim 10, wherein the U-shaped ring seals of the tongue and groove seal and the secondary ring seal U-rings are formed of a polytetrafluoroethylene based material or a polyetheretherketone based material.

13. The gate valve as set forth in claim 12, wherein the carrier rings are present, and the gate valve further comprises a ring seal between the carrier ring and the radial base of the seat pocket.

14. The gate valve as set forth in claim 8, wherein the carrier rings are present, and wherein the gate valve further comprises a ring seal between the carrier ring and the radial base of the seat pocket.

15. The gate valve as set forth in claim 1, wherein the carrier rings, if present, may include a ring seal to the radial base of the seat pocket.

16. The gate valve as set forth in claim 15, wherein the bridging seal includes:
a first annular groove formed either on the first seal surface of the annular seat member or, on the radial base or carrier ring if present;
a second annular groove formed in the member opposite the first annular groove, said second annular groove being aligned with the first annular groove; and
a non-metallic bridge ring insert held in each of the first and second annular grooves so as to bridge any gap at the first seal surface such that sealing engagement is maintained across said gap at all times as the gate is moved between the open and closed positions.

17. The gate valve as set forth in claim 16, wherein each annular seat element is formed with a central bore aligned with the flowbore of the valve body such that the first seal surface of the annular seat element has a periphery edge opposite its flowbore edge, and wherein the gate valve further comprises a secondary ring seal formed as a) a corner seal at or adjacent the periphery edge of each annular seat element, b) a face seal on the first seal surface of the annular seat element, or c) an outside diameter seal at the outside diameter of the annular seat element.

18. The gate valve as set forth in claim 17, wherein the secondary ring seal comprises an O-ring seal formed as a corner, face or outside diameter seal.

19. The gate valve as set forth in claim 17, wherein the secondary ring seal comprises an O-ring or a U-ring seal formed as a corner, face or outside diameter seal.

20. The gate valve as set forth in claim 19, wherein the bridge ring insert extends into the first and second annular grooves with a depth that is greater than the limited axial movement permitted by the sum of all the gaps along the flowbore axis of the annular seat elements between the gate, the annular seat elements, the seat pockets and the carrier rings, if present.

21. The gate valve as set forth in claim 20, wherein one of the first and second annular grooves is radially larger than the other, and wherein a portion of the bridge ring insert is likewise radially larger to mate with the radially larger of the first and second annular grooves.

22. The gate valve as set forth in claim 20, wherein the bridge ring insert comprises:
a pair of opposing, aligned, non-metallic, U-shaped ring inserts held between and in the first and second annular grooves, the U-shaped ring inserts having leg portions which face each other in abutting relationship to form a generally rectangular space therebetween; and
a generally rectangular ring insert held in tight fitting relationship enclosed in the rectangular space.

23. The gate valve as set forth in claim 22, wherein the U-shaped ring inserts are formed of a thermoplastic material, and the rectangular ring insert is formed of a metallic or thermoplastic material.

24. The gate valve as set forth in claim 22, wherein the U-shaped ring inserts are formed of a thermoplastic material, and the rectangular ring insert is formed of a metallic or thermoplastic material.

25. The gate valve as set forth in claim 20, wherein the bridge ring insert is formed of a thermoplastic material.

26. The gate valve as set forth in claim 25, wherein the bridge ring seal is formed of a polytetrafluoroethylene based material or a polyetheretherketone based material.

27. The gate valve as set forth in claim 16, wherein the bridge ring insert comprises:
a pair of opposing, aligned, non-metallic, U-shaped ring inserts held between and in the first and second annular grooves, the U-shaped ring inserts having leg portions which face each other in abutting relationship to form a generally rectangular space therebetween; and
a generally rectangular ring insert held in tight fitting relationship enclosed in the rectangular space.

28. A gate valve as set forth in claim 1, further comprising:
a secondary non-metallic ring seal in the form of a U-ring located in an annular groove formed in the annular seat element, or in the seat pocket or in the carrier ring if present, the secondary ring seal being formed as one or more of:
i) a corner seal at or adjacent the periphery edge of each annular seat element;

ii) a face seal on the first seal surface of the annular seat element located on either or both sides of the non-metallic bridging seal; or iii) an outside diameter seal at the outside diameter of the annular seat element.

29. The gate valve as set forth in claim 28, wherein the bridging seal is a tongue and groove seal formed between the first seal surface of each annular seat element and, either the radial base of the seat pocket, or the carrier ring if present, the tongue and groove seal maintaining sealing engagement within the seat pocket while still permitting the limited axial movement of the annular seat element.

30. The gate valve as set forth in claim 29, wherein:
   a) the tongue of the tongue and groove seal is provided by an annular lip formed on either the radial base of the seat pocket, or the carrier ring if present, and the groove is provided by a non-metallic generally U-shaped ring seal seated in a first annular groove provided in the first seal surface of the annular seat element opposite the annular lip; or
   b) the tongue of the tongue and groove seal is provided by an annular lip formed on the first seal face of the annular seat element, and the groove is provided by a non-metallic generally U-shaped ring seal seated in a first annular groove provided in either the radial base of the seat pocket, or the carrier ring, if present, opposite the annular lip; or
   c) the tongue of the tongue and groove seal is provided by an annular lip formed on a metallic or non-metallic tongue-forming ring insert installed in the radial base of the seat pocket, or the carrier ring if present, and the groove is provided by a non-metallic generally U-shaped ring seal seated in a first annular groove provided in the first seal surface of the annular seat element opposite the annular lip; or
   d) the tongue of the tongue and groove seal is provided by an annular lip formed on a metallic or non-metallic tongue-forming ring insert installed in the annular seat element, and the groove is provided by a non-metallic generally U-shaped ring seal seated in a first annular groove provided in either the radial base of the seat pocket, or the carrier ring, if present, opposite the annular lip.

31. The gate valve as set forth in claim 30, wherein each annular seat element is formed with a central bore aligned with the flowbore of the valve body.

32. The gate valve as set forth in claim 31, wherein the tongue of the tongue and groove seal extends into the groove with a depth that is greater than the limited axial movement permitted by the sum of all the gaps along the flowbore axis of the annular seat elements between the gate, the annular seat elements, the seat pockets and the carrier rings, if present.

33. The gate valve as set forth in claim 32, wherein the radial base, or the carrier ring if present, is formed with secondary annular grooves to accept the leg portions of the generally U-shaped ring seals.

34. The gate valve as set forth in claim 32, wherein the secondary ring seal U-ring has a base portion and leg portions, wherein the U-ring is oriented in the annular groove such that the leg portions open away from the tongue and groove seal.

35. The gate valve as set forth in claim 34, wherein the secondary ring seal U-ring is shaped so as to vent pressure build up between the tongue and groove seal and the U-ring.

36. The gate valve as set forth in claim 35, wherein the U-shaped ring seals of the tongue and groove seal and the secondary ring seal U-rings are formed of a thermoplastic material.

37. The gate valve as set forth in claim 35, wherein the U-shaped ring seals of the tongue and groove seal and the secondary ring seal U-rings are formed of a polytetrafluoroethylene based material or a polyetheretherketone based material.

38. The gate valve as set forth in claim 37, wherein the carrier rings are present, and the gate valve further comprises a ring seal between the carrier ring and the radial base of the seat pocket.

39. The gate valve as set forth in claim 32, wherein the carrier rings are present, and wherein the gate valve further comprises a ring seal between the carrier ring and the radial base of the seat pocket.

40. The gate valve as set forth in claim 1, further comprising:
   a secondary non-metallic seal located in an annular groove formed in the annular seat element, or in the seat pocket or the carrier ring if present, the secondary seal being formed as a face seal on the first seal surface of the annular seat element, and being located on the flowbore side of the bridging seal.

41. The gate valve as set forth in claim 40, wherein the bridging seal is a tongue and groove seal formed between the first seal surface of each annular seat element and, either the radial base of the seat pocket, or the carrier ring if present, the tongue and groove seal maintaining sealing engagement within the seat pocket while still permitting the limited axial movement of the annular seat element.

42. The gate valve as set forth in claim 41, wherein:
   a) the tongue of the tongue and groove seal is provided by an annular lip formed on either the radial base of the seat pocket, or the carrier ring if present, and the groove is provided by a non-metallic generally U-shaped ring seal seated in a first annular groove provided in the first seal surface of the annular seat element opposite the annular lip; or
   b) the tongue of the tongue and groove seal is provided by an annular lip formed on the first seal face of the annular seat element, and the groove is provided by a non-metallic generally U-shaped ring seal seated in a first annular groove provided in either the radial base of the seat pocket, or the carrier ring, if present, opposite the annular lip; or
   c) the tongue of the tongue and groove seal is provided by an annular lip formed on a metallic or non-metallic tongue-forming ring insert installed in the radial base of the seat pocket, or the carrier ring if present, and the groove is provided by a non-metallic generally U-shaped ring seal seated in a first annular groove provided in the first seal surface of the annular seat element opposite the annular lip; or
   d) the tongue of the tongue and groove seal is provided by an annular lip formed on a metallic or non-metallic tongue-forming ring insert installed in the annular seat element, and the groove is provided by a non-metallic generally U-shaped ring seal seated in a first annular groove provided in either the radial base of the seat pocket, or the carrier ring, if present, opposite the annular lip.

43. The gate valve as set forth in claim 42, wherein each annular seat element is formed with a central bore aligned with the flowbore of the valve body.

44. The gate valve as set forth in claim 43, wherein the tongue of the tongue and groove seal extends into the groove with a depth that is greater than the limited axial movement permitted by the sum of all the gaps along the flowbore axis of the annular seat elements between the gate, the annular seat elements, the seat pockets and the carrier rings, if present.

45. The gate valve as set forth in claim 44, wherein the radial base, or the carrier ring if present, is formed with secondary annular grooves to accept the leg portions of the generally U-shaped ring seals.

46. The gate valve as set forth in claim 44, wherein the secondary seal is one or more of an O-ring seal, U-ring seal, or a wiper seal.

47. The gate valve as set forth in claim 44, wherein the secondary seal is an U-ring seal.

48. The gate valve as set forth in claim 47, wherein the secondary U-ring seal is shaped to vent pressure build up between the tongue and groove seal and the secondary seal.

49. The gate valve as set forth in claim 48, wherein the U-shaped ring seals of the tongue and groove seal are formed of a thermoplastic material.

50. The gate valve as set forth in claim 48, wherein the U-shaped ring seals of the tongue and groove seal are formed of a polytetrafluoroethylene based material or a polyetheretherketone based material.

51. The gate valve as set forth in claim 50, wherein the carrier rings are present, and wherein the gate valve further comprises a ring seal between the carrier ring and the radial base of the seat pocket.

52. The gate valve as set forth in claim 50, wherein the carrier rings are present, and wherein the gate valve further comprises a ring seal between the carrier ring and the radial base of the seat pocket.

* * * * *